(12) United States Patent
Eshraghi et al.

(10) Patent No.: US 7,422,813 B2
(45) Date of Patent: Sep. 9, 2008

(54) FUEL CELL SYSTEMS COMPRISING MICROFIBROUS FUEL CELL ELEMENTS AND METHODS OF MAKING AND USING SAME

(75) Inventors: Ray R. Eshraghi, Cary, NC (US); Yongchao Si, Chapel Hill, NC (US)

(73) Assignee: Microcell Corporation, Raleigh, NC (US)

( * ) Notice: Subject to any disclaimer, the term of this patent is extended or adjusted under 35 U.S.C. 154(b) by 518 days.

(21) Appl. No.: 10/863,705

(22) Filed: Jun. 8, 2004

(65) Prior Publication Data

US 2005/0271920 A1   Dec. 8, 2005

(51) Int. Cl.
*H01M 8/10* (2006.01)
(52) U.S. Cl. ............................. 429/30; 429/34; 429/40; 429/38
(58) Field of Classification Search .................... 429/30, 429/40, 41, 42, 43, 44, 34, 38; 427/115; 521/27, 28; 502/101
See application file for complete search history.

(56) References Cited

U.S. PATENT DOCUMENTS

| | | | |
|---|---|---|---|
| 5,547,551 A | 8/1996 | Bahar et al. | |
| 5,916,514 A | 6/1999 | Eshraghi | |
| 5,928,808 A | 7/1999 | Eshraghi | |
| 5,989,300 A | 11/1999 | Eshraghi | |
| 6,001,500 A | 12/1999 | Bass et al. | |
| 6,004,691 A | 12/1999 | Eshraghi | |
| 6,042,958 A * | 3/2000 | Denton et al. | 429/30 |
| 6,338,913 B1 * | 1/2002 | Eshraghi | 429/41 |
| 6,399,232 B1 | 6/2002 | Eshraghi | |
| 6,403,248 B1 | 6/2002 | Eshraghi | |
| 6,403,517 B1 | 6/2002 | Eshraghi | |
| 6,444,339 B1 | 9/2002 | Eshraghi | |
| 6,485,856 B1 | 11/2002 | Brown et al. | |
| 6,495,281 B1 | 12/2002 | Eshraghi | |
| 2004/0005498 A1 | 1/2004 | Eshraghi | |
| 2004/0058224 A1 | 3/2004 | Eshraghi et al. | |
| 2004/0142101 A1 | 7/2004 | Eshraghi et al. | |

FOREIGN PATENT DOCUMENTS

JP    2003100316    4/2003

\* cited by examiner

*Primary Examiner*—Raymond Alejandro
(74) *Attorney, Agent, or Firm*—Steven J. Hultquist; Intellectual Property/Technology Law

(57) ABSTRACT

Fuel cells having microfibrous hollow membrane separators with fiber-reinforced ion exchange polymeric membrane walls. The reinforcing fibers are continuous and extend along directions which are substantially parallel to the longitudinal axis of the microfibrous fuel cell.

18 Claims, 10 Drawing Sheets

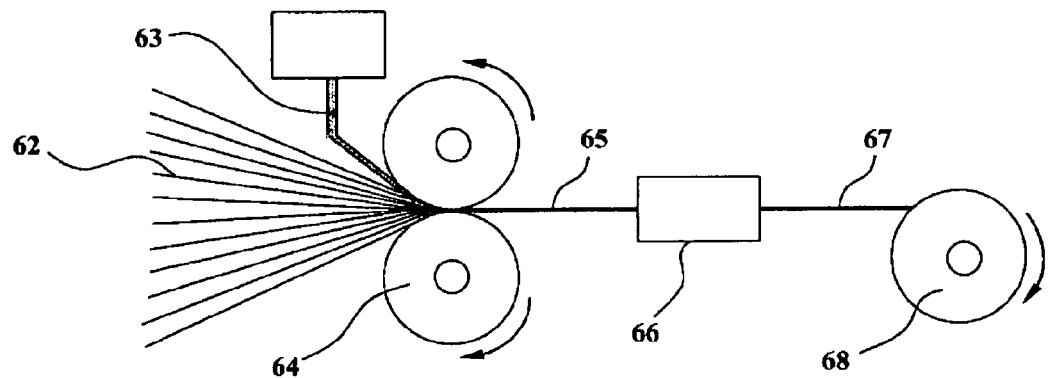
Figure 6
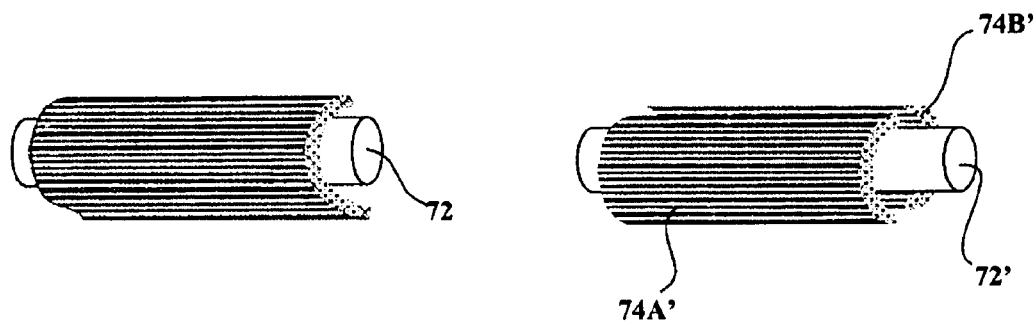
Figure 7A                Figure 7B

FUEL CELL SYSTEMS COMPRISING MICROFIBROUS FUEL CELL ELEMENTS AND METHODS OF MAKING AND USING SAME

BACKGROUND OF THE INVENTION

1. Field of the Invention

The present invention relates to microfibrous direct methanol fuel cells (DMFCS) and fuel cell systems that comprise one or more such microfibrous DMFCs, and methods of making and using same.

2. Description of the Related Art

A direct methanol fuel cell (DMFC) generates electricity via the following two electrochemical reactions:

(A) anodic disassociation of methanol/water mixture:

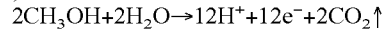
$2CH_3OH + 2H_2O \rightarrow 12H^+ + 12e^- + 2CO_2 \uparrow$ (B) cathodic combination of protons, electrons and oxygen:

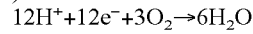
$12H^+ + 12e^- + 3O_2 \rightarrow 6H_2O$

The anode and cathode of the DMFC are separated by a proton-conductive membrane (PCM) that is impermeable to electrons, thereby forcing the electrons to travel from the anode to the cathode through a loading-bearing external circuit to generate electrical power.

Polysulfone-based polymers, perfluorocarboxylic-acid-based polymers, styrene-vinyl-benzene-sulfonic-acid-based polymers, and styrene-butadiene-based polymers are all suitable ion exchange polymers for forming PCMs. Commercially available PCMs include the Nafion® membranes supplied by E. I. Dupont, the Flemion® membranes manufactured by Asahi Glass Company, and the Aciplex® membranes by Asahi Chemical Company. Nafion® as used herein is a trademark of E.I. Dupont de Nemours (Wilmington, Del.) for a sulfonated tetrafluorethylene copolvmer. Flemion® as used herein is a trademark of Asahi Glass Co., Ltd. (Tokyo. Japan) for a perfluorinated ionic polymer. Aciplex® as used herein is a trademark of Asahi Chemical Co., Ltd. (Tokyo. Japan) for perfiucrosulfonic acid.

A common problem associated with the PCMs is methanol crossover, i.e., the methanol fuel diffuses through the PCMs and directly reacts with oxygen at the cathode without generating any electricity. Cell potential as well as the energy efficiency of the DMFC can be significantly reduced by methanol crossover. Further, heat generated by methanol oxidation at the cathode is detrimental to the DMFC structure.

Current solutions to the methanol crossover problem include: (1) uses of dilute methanol solutions containing only 3% to 6% methanol, and (2) uses of thicker PCMs. However, dilution of the methanol fuel deleteriously reduces the energy density of the fuel and is not suitable for portable power applications. Use of thicker PCMs, on the other hand, significantly increases the manufacturing cost of the DMFCs, since the PCM is a high cost component of the DMFC.

Further, PCMs demonstrate significant dimensional changes during operation cycles. Hydrophilicity of the ion-exchange polymers used in the PCMs causes excessive swelling of the PCMs upon hydration, and corresponding shrinking upon dehydration. Repeated swelling and shrinking of the PCM have deleterious effects on the cell structure and long-term performance of the DMFC.

It is therefore an object of the present invention to provide a PCM structure of reduced methanol crossover and reduced dimension changes, which is suitable for long-term use with methanol fuel solutions in direct methanol fuel cell systems.

It is another object of the present invention to provide a DMFC system with enhanced fuel efficiency and mechanical reliability.

It is a further object of the present invention to provide a DMFC system capable of using concentrated methanol fuel solutions, i.e., containing at least 30% methanol by weight, more preferably 50% methanol by weight, and most preferably pure methanol, without need for further dilution of such fuel solutions upon actual usage.

It is still a further object of the present invention to provide a DMFC system with reduced size and weight, which can be manufactured cost-effectively through automated production lines and which are particular suitable for use in various portable electronic devices.

Other objects of the present invention will be more fully apparent from the ensuing disclosure and appended claims.

SUMMARY OF THE INVENTION

The present invention in one aspect relates to a microfibrous hollow membrane structure having a longitudinal axis and comprising a polymeric membrane wall that defines a bore side and a shell side. One or more continuous fibers are embedded in such polymeric membrane wall and extend along directions that are substantially parallel to the longitudinal axis of the membrane structure.

The terms "microfibrous" and "fibrous" are used interchangeably to define an elongated structure having a longitudinal axis and an average transverse dimension (as measured along a direction perpendicular to such longitudinal axis) within a range of from about 10 microns to about 10 millimeters, preferably from about 10 microns to about 5 millimeters, and more preferably from about 10 microns to about 1 millimeter.

The term "continuous" as used herein refers to longitudinal extension of the fibers along the microfibrous hollow membrane structure, i.e., such fibers are either coextensive or substantially coextensive with the membrane structure in its longitudinal direction.

Preferably, the polymeric membrane wall of such microfibrous hollow membrane structure comprises an ion exchange polymer that is selected from the group consisting of per-flurocarbon-sulfonic-acid-based polymers, polysulfone-based polymers, perfluorocarboxylic-acid-based polymers, styrene-vinyl-benzene-sulfonic-acid-based polymers, and styrene-butadiene-based polymers. More preferably, such polymeric membrane wall comprises a perfluorosulfonate ionomer. Commercially available ion exchange polymers such as the Nafion® manufactured by E. I. Dupont, the Flemion® produced by Asahi Glass Company, and the Aciplex® produced by Asahi Chemical Company can be advantageously used for forming the polymeric membrane wall of the present invention.

When the polymeric membrane wall comprises an ion exchange polymer that is susceptible to excessive swelling/shrinking upon hydration/dehydration, the continuous fibers embedded in such polymeric membrane wall are preferably characterized by a swell potential that is lower than that of the polymeric membrane wall. In such manner, the continuous fibers function as anti-swelling support structures to reduce the dimensional changes of the membrane structure along its longitudinal axis during hydration/dehydration cycles.

The continuous fibers can be made of any materials and may include, without limitation, glass fibers, carbon fibers, polymer fibers, metal fibers, and composites or combinations thereof. Preferably, such continuous fibers comprise glass fibers. The average cross-sectional diameter of such continuous fibers is preferably in a range of from about 0.1 μm to about 500 μm, more preferably from about 1 μm to about 250 μm, and most preferably from about 5 μm to about 100 μm.

Another aspect of the present invention relates to a method for forming a microfibrous hollow membrane structure as described hereinabove, comprising the steps of:
(a) providing a removable microfibrous substrate having a longitudinal axis;
(b) providing one or more continuous fibers and a polymeric membrane-forming composition;
(c) forming over the microfibrous substrate a polymeric membrane-forming composition layer having one or more continuous fibers embedded therein, wherein such continuous fibers are arranged substantially parallel to the longitudinal axis of the microfibrous substrate;
(d) treating the polymeric membrane-forming composition layer to form a polymeric membrane wall having one or more continuous fibers embedded therein; and
(e) removing the removable microfibrous substrate from within such polymer membrane wall.

Yet another aspect of the present invention relates to another method for forming the above-described microfibrous hollow membrane structure, comprising the steps of:
(a) providing a removable microfibrous substrate having a longitudinal axis;
(b) providing one or more fiber-reinforced membrane structures, each of which comprise a polymeric membrane having multiple continuous fibers embedded therein, wherein such continuous fibers are substantially parallel to one another;
(c) forming a fiber-reinforced polymeric membrane wall around the removable microfibrous substrate by using such one or more fiber-reinforced membrane structures, wherein the continuous fibers in the fiber-reinforced membrane structures are arranged substantially parallel to the longitudinal axis of the microfibrous substrate; and
(d) removing the removable microfibrous substrate from within the fiber-reinforced polymeric membrane wall.

Still another aspect of the present invention relates to a fiber-reinforced membrane structure comprising a polymeric membrane with multiple continuous fibers embedded therein, wherein such multiple continuous fibers are substantially parallel to one another.

Still another aspect of the present invention relates to a method for forming a fiber-reinforced membrane structure as described hereinabove, such method comprising the steps of:
(a) providing multiple continuous fibers;
(b) incorporating such continuous fibers into a polymeric membrane precursor, wherein such continuous fibers are arranged substantially parallel to one another; and
(c) treating the polymeric precursor to form a fiber-reinforced membrane structure having a polymeric membrane with multiple continuous fibers embedded therein.

A further aspect of the present invention relates to a microfibrous direct methanol fuel cell element having a longitudinal axis and comprising:
(a) a microfibrous hollow membrane separator defining a bore side and a shell side;
(b) an inner current collector at the bore side of such membrane separator;
(c) an inner electrocatalyst layer in contact with the inner current collector and an inner surface of the membrane separator;
(d) an outer current collector at the shell side of such membrane separator; and
(e) an outer electrocatalyst layer in contact with the outer current collector and an outer surface of the membrane separator, wherein such microfibrous hollow membrane separator comprises an ion exchange polymeric membrane wall with one or more continuous fibers embedded therein, wherein the one or more continuous fibers extend along directions that are substantially parallel to the longitudinal axis of the fuel cell element, and wherein an inner fluid passage is provided between the inner electrocatalyst layer and the inner current collector for flow of either a methanol-containing or an oxygen-containing fluid.

A still further aspect of the present invention relates to a method for forming a microfibrous direct methanol fuel cell element as described hereinabove, comprising the steps of:
(a) providing one or more continuous fibers; and
(b) using said one or more continuous fibers to form such microfibrous direct methanol fuel cell element.

A still further aspect of the present invention relates to another method for forming a microfibrous direct methanol fuel cell element as described hereinabove, comprising the steps of:
(a) providing one or more fiber-reinforced membrane structures, each of which comprises an ion exchange polymeric membrane with multiple continuous fibers embedded therein, wherein the multiple continuous fibers are substantially parallel to one another; and
(b) using said one or more fiber-reinforced membrane structures to form such microfibrous direct methanol fuel cell element.

Another aspect of the present invention relates to a microfibrous direct methanol fuel cell element, comprising:
(a) a first microfibrous hollow membrane comprising an ion exchange polymer and defining a bore side and a shell side;
(b) an inner current collector at the bore side of such first microfibrous hollow membrane;
(c) an inner electrocatalyst layer contacting the inner current collector and an inner surface of such first microfibrous hollow membrane;
(d) an outer current collector at the shell side of such first microfibrous hollow membrane;
(e) an outer electrocatalyst layer contacting the outer current collector and an outer surface of such first microfibrous hollow membrane; and
(f) a second microfibrous hollow membrane disposed either at the bore or the shell side of the first microfibrous hollow membrane,
wherein an inner fluid passage is provided at the bore side of said first microfibrous hollow membrane and between said inner current collector and said inner electrocatalyst layer, and wherein said second microfibrous hollow membrane encloses an additional fluid passage that is separate from said inner fluid passage.

In this specific configuration, the first microfibrous hollow membrane functions as an ion exchange membrane separator for isolating the inner electrocatalyst layer from the outer electrocatalyst layer and for conducting protons therethrough, while the second microfibrous hollow membrane functions as a fuel-delivering element for controlled delivery of a methanol-containing fuel fluid. Such second microfibrous hollow membrane is arranged and constructed to allow only a portion of the methanol-containing fuel fluid to diffuse through its membrane wall, thereby defining a methanol concentration differential across its membrane wall, which is characterized by higher methanol concentration at the outside of such membrane wall and lower methanol concentration at the inside.

The second microfibrous hollow membrane may comprise any suitable membrane that limits diffusion of the methanol-containing fuel fluid, including but not limited to, microporous membranes, semipermeable membranes, and composites and combinations thereof.

The term "microporous" as used herein defines a porous structure having an average pore size in a range of from about 1 Angstrom to about 100 microns, more preferably from about 1 Angstrom to about 10 microns, and most preferably from about 5 Angstrom to about 5 microns.

The term "semipermeable" as used herein defines a non-porous structure that is selectively permeable to certain molecules (e.g., water and methanol) through sorption and diffusion of such molecules through the structure.

Still another aspect of the present invention relates to a direct methanol fuel cell assembly that comprises:
  (a) a leak-tightly sealed housing having one or more fluid inlets and one or more fluid outlets;
  (b) multiple microfibrous direct methanol fuel cell elements disposed in such housing, wherein each microfibrous direct methanol fuel cell comprises:
    (i) a microfibrous hollow membrane separator defining a bore side and a shell side;
    (ii) an inner current collector at the bore side thereof;
    (iii) an inner electrocatalyst layer contacting the inner current collector and an inner surface of the membrane separator;
    (iv) an outer current collector at the shell side of such membrane separator; and
    (v) an outer electrocatalyst layer contacting the outer current collector and an outer surface of the membrane separator;
    wherein an inner fluid passage is provided at the bore side of said microfibrous hollow membrane separator and between said inner current collector and said inner electrocatalyst layer;
  (c) one or more microfibrous hollow membrane structures disposed in said housing at the shell sides of said multiple microfibrous direct methanol fuel cell elements, wherein each of said microfibrous hollow membrane structures encloses an outer fluid passage that is separate from the inner fluid passages of the fuel cell elements.

Other aspects, features and advantages of the invention will be more fully apparent from the ensuing disclosure and appended claims.

BRIEF DESCRIPTION OF THE DRAWINGS

FIG. 6 illustrates a process for fabricating the ribbon-like membrane structure of FIG. 5, according to one embodiment of the present invention.

FIGS. 7A and 7B show a process for conforming one or more ribbon-like membrane structures of FIG. 5 onto a microfibrous substrate, to form a part of a fiber-reinforced polymeric membrane.

DETAILED DESCRIPTION OF THE INVENTION AND PREFERRED EMBODIMENTS THEREOF

The present invention in general relates to direct methanol fuel cell systems comprising microfibrous direct methanol fuel cell elements.

Microfibrous electrochemical cells are described in general by U.S. Pat. Nos. 5,916,514; 5,928,808; 5,989,300; 6,004,691; 6,338,913; 6,399,232; 6,403,248; 6,403,517; 6,444,339; and 6,495,281, the contents of which are incorporated herein by reference in their respective entireties and for all purposes.

Among various electrochemical cells, direct methanol fuel cells (DMFCs) are especially attractive for portable electronic applications, due to their relatively small sizes and weight and their capability of directly using liquid fuel without any reformer systems. Further, DMFCs are categorized as zero-emission power sources and are environmentally friendly.

However, performance of the conventional DMFCs is adversely affected by the methanol crossover and dimensional instability problems associated the proton conductive membrane separator, as described hereinabove.

In the ensuring sections, several new DMFC structures are described and illustrated, according to various embodiments of the present invention, for overcoming the above-described problems that persist in the conventional DMFCs:

Microfibrous DMFCS with Fiber-Reinforced Hollow Membrane Seperators

One aspect of the present invention relates to employment of a fiber-reinforced hollow membrane separator for forming a microfibrous DMFC structure.

Specifically, the present invention provides a new microfibrous hollow membrane structure, which comprises an elongated, tubular polymeric membrane wall that encloses a lumen therein. Such microfibrous hollow membrane structure has a longitudinal axis, while one or more continuous fibers are embedded in its polymeric membrane wall and extending along directions that are parallel or substantially parallel to its longitudinal axis. The average transverse dimension of such microfibrous hollow membrane structure is preferably from about 10 microns to about 10 millimeters, more preferably from about 10 microns to about 5 millimeters, and most preferably from about 10 microns to about 1 millimeter, as measured along a direction perpendicular to its longitudinal axis.

Further, the microfibrous hollow membrane structure of the present invention is preferably free of fibers that are orthogonally oriented in relation to its longitudinal axis, and more preferably, it is free of fibers that are not parallelly aligned with its longitudinal axis. In other words, essentially all the fibers embedded in the polymeric membrane wall of such microfibrous hollow membrane structure are unidirectional, and they all align parallelly with the longitudinal axis of the membrane structure. Such unidirectional arrangement of the continuous fibers advantageously facilitates conformation of such fibers to the microfibrous contour of the membrane structure and effectively minimizes conformational stress on individual fibers.

Figure 1A:
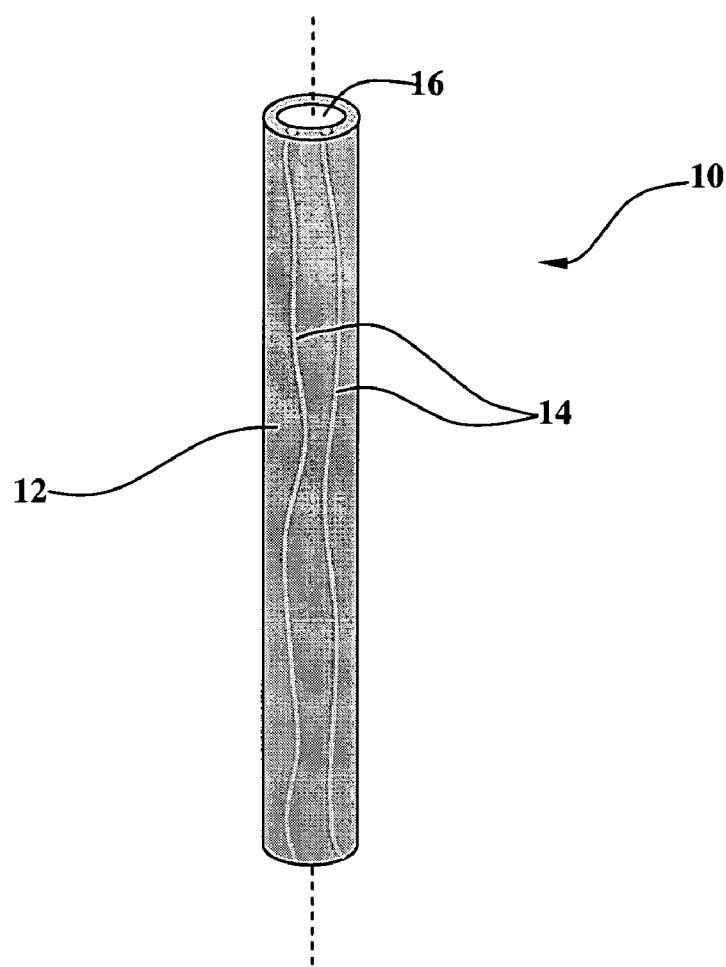
FIG. 1A is an illustrative view of a microfibrous hollow membrane, according to one embodiment of the present invention.
Figure 1B:
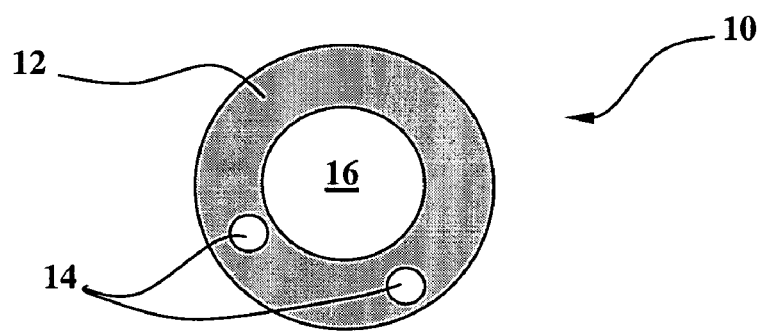
FIG. 1B is a cross-sectional of the microfibrous hollow membrane of FIG. 1.

FIGS. 1A and 1B illustrate an exemplary microfibrous hollow membrane structure 10, which comprises an elongated microfibrous polymeric membrane wall 12 that encloses a lumen 16 therein. Two continuous fibers 14 are embedded in the polymeric membrane wall 12 of such microfibrous hollow membrane structure 10, while such fibers 14 are both aligned in substantially parallel directions along a longitudinal axis (as shown by the dotted line) of the microfibrous hollow membrane structure 10. Although only two fibers are shown herein for illustration purposes, usually more than two fibers are used in reality to provide sufficient mechanical reinforcement to the membrane structure.

The continuous fibers embedded in the polymeric membrane wall of the microfibrous hollow membrane structure of the present invention may include any fibers of sufficient tensile strength to enhance the mechanical endurance of the membrane structure and to sustain its structural integrity under stress. For example, such continuous fibers may include, without limitation, glass fibers, carbon fibers, polymeric fibers, metal fibers, and various composite fibers formed of two or more different materials.

In a preferred embodiment of the present invention, the polymeric membrane wall of the microfibrous hollow membrane structure comprises an ion exchange polymer, and such hollow membrane structure therefore can be used to form a microfibrous hollow membrane separator for the microfibrous fuel cell as described by U.S. Pat. Nos. 5,916,514; 5,928,808; 5,989,300; 6,338,913; 6,399,232; 6,403,248; 6,403,517; 6,444,339; and 6,495,281. For example, such polymeric membrane wall may comprise one or more ion exchange polymers selected from the group consisting of perflurocarbon-sulfonic-acid-based polymers, polysulfone-based polymers, perfluorocarboxylic-acid-based polymers, styrene-vinyl-benzene-sulfonic-acid-based polymers, and styrene-butadiene-based polymers. In a particularly preferred embodiment, a perflurosulfonat ionomer, such as Nafion® manufactured by E. I. Dupont, is used to form the polymeric membrane wall of the microfibrous hollow membrane structure.

As mentioned hereinabove, ion exchange polymers such as Nafion® are susceptible to deleterious dimensional changes during hydration/dehydration cycles, i.e., expansion upon hydration and contraction upon dehydration. The present invention therefore incorporates continuous fibers having a swelling potential that is less than that of the ion exchange polymers into the polymeric membrane wall, for reducing or eliminating axial or longitudinal expansion/contraction of such polymeric membrane wall (which contributes to major deterioration of the polymeric matrix and is most deleterious to the membrane structure) and maintaining structural integrity of the microfibrous hollow membrane structure. Preferably, such continuous fibers are characterized by a swelling potential of less than 5%, more preferably less than 2%, and most preferably less than 1%, by total volume of such fibers. Glass fibers having an average cross-sectional diameter of from about 0.1 μm to about 500 μm may be used, as well as other types of fibers as described hereinabove.

Fiber-reinforced microfibrous hollow membranes comprising ion exchange polymeric membrane walls, as described hereinabove, can be used to form ion exchange membrane separators that are particularly suitable for DMFC applications. Dimensional stability imparted by the reinforcing fibers significantly limits longitudinal or axial swelling of such ion exchange membrane separators when contacted with the methanol/water fuel solution, and hence reduce methanol crossover that persists in conventional DMFC cells, without compromising the ionic conductivity of the polymer electrolyte. Further, the dimensional stability of the membrane separators helps to extend the service life of the fuel cells.

Figure 2A:
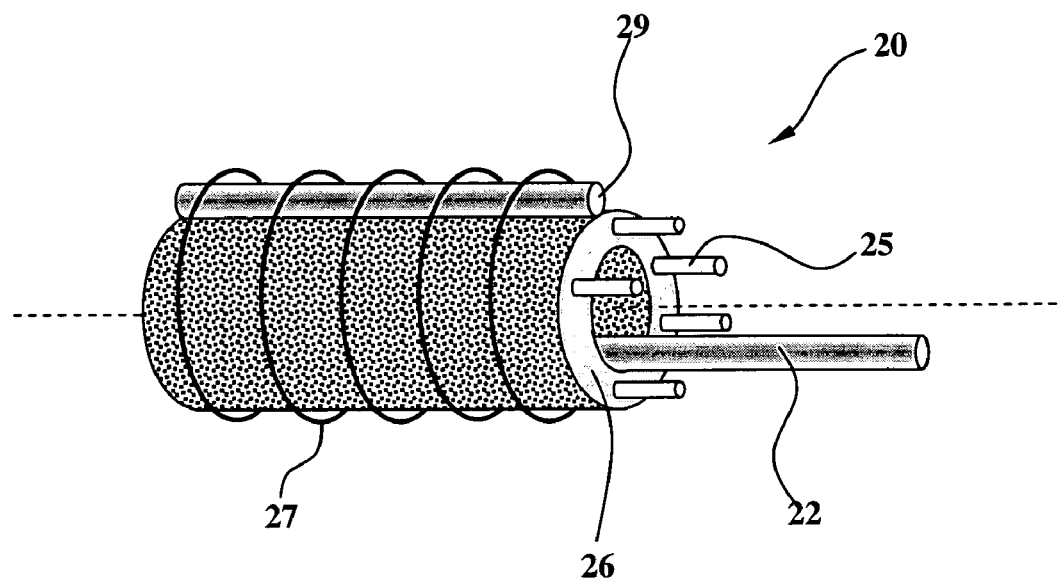
FIG. 2A is a partial illustrative view of a microfibrous direct methanol fuel cell element incorporating a fiber-reinforced hollow membrane separator, according to one embodiment of the present invention.
Figure 2B:
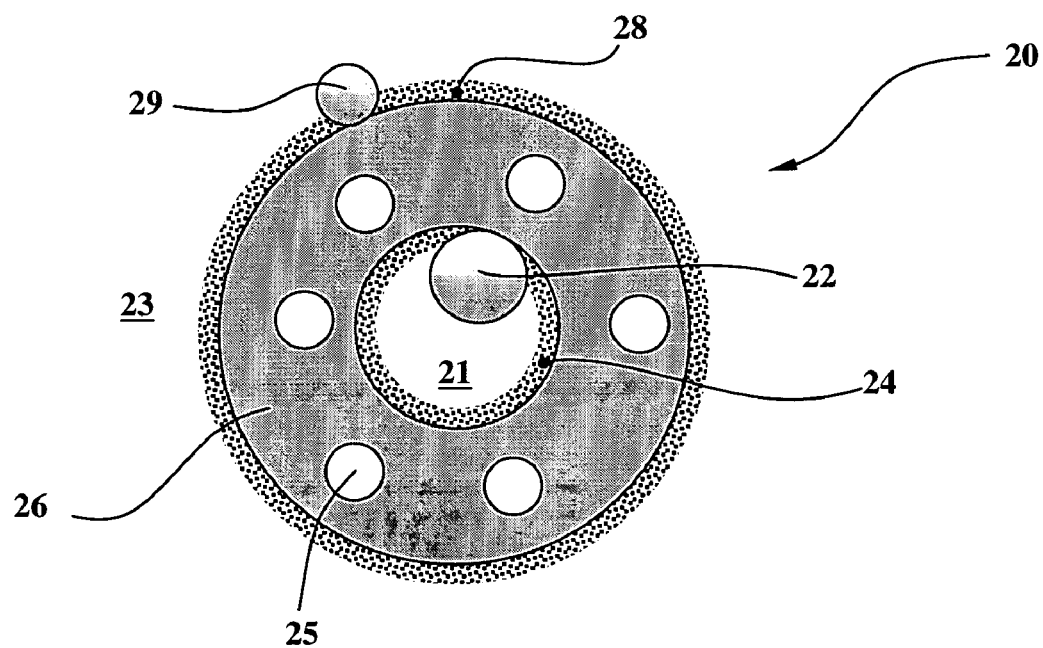
FIG. 2B is a cross-sectional view of the microfibrous direct methanol fuel cell element of FIG. 2A.

FIGS. 2A and 2B illustrative show a microfibrous direct methanol fuel cell 20, which incorporates a fiber-reinforced ion exchange membrane separator according to the above description. Specifically, such microfibrous direct methanol fuel cell 20 comprises a microfibrous hollow membrane separator 26 defining a bore side 21 and a shell side 23. Such membrane separator 26 comprises an ion exchange polymeric membrane wall embedded with multiple continuous fibers 25, which extend along a direction that is substantially parallel to a longitudinal axis of the fuel cell 20 (as marked by a dotted line). The bore side of the membrane separator 26 contains an inner current collector 22 and an inner electrocatalyst layer 24 that is in contact with such inner current collector 22 and an inner surface of the membrane separator 26. The shell side of the membrane separator 26 contains an outer current collector 29 and an outer electrocatalyst layer 28 that is in contact with such outer current collector 29 and an outer surface of the membrane separator 26, while a wrapping fiber 27 wraps around all the components to form an integral and unitary fuel cell structure.

A lumen is provided between the inner current collector 22 and the inner electrocatalyst layer 24 (see FIG. 2B), which functions as an inner fluid passage for supplying either a methanol-containing fluid (e.g., a methanol/water solution)

or an oxygen-containing fluid (e.g., air or oxygen) to the bore side of the fuel cell 20. Concurrently, an oxygen- or methanol-containing fluid (which is different from the fluid supplied at the bore side of the fuel cell 20) is provided at the shell side of such fuel cell. In a preferred embodiment of the present invention, the inner fluid passage supplies a methanol-containing fluid, such as a methanol/water solution, to the fuel cell 20 at the bore side, while the shell side of the fuel cell 20 is arranged in an air-breathing configuration, which allows ambient air to diffuse through the outer electrocatalyst layer in a natural and unobstructed manner, so as to provide oxygen to the fuel cell 20 without additional fluid circuitry. Such air-breathing configuration can significantly reduce the structural complexity, as well as the size and weight, of the fuel cells of the present invention, rendering them particularly suitable for portable electronic applications.

Figure 3A:
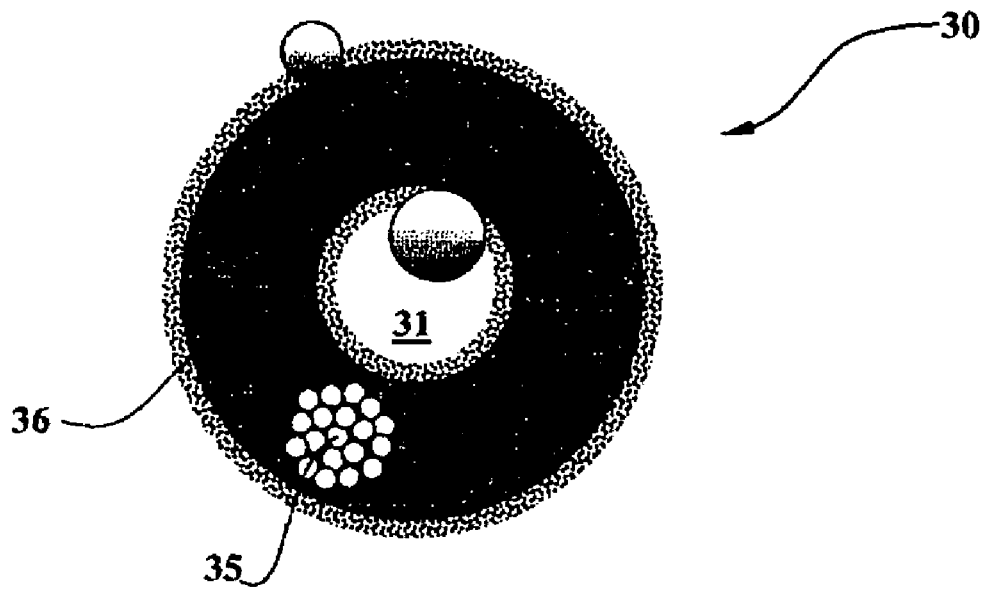
FIG. 3A is a cross-sectional view of a microfibrous direct methanol fuel cell element incorporating a fiber-reinforced hollow membrane separator, according to one embodiment of the present invention.
Figure 3B:
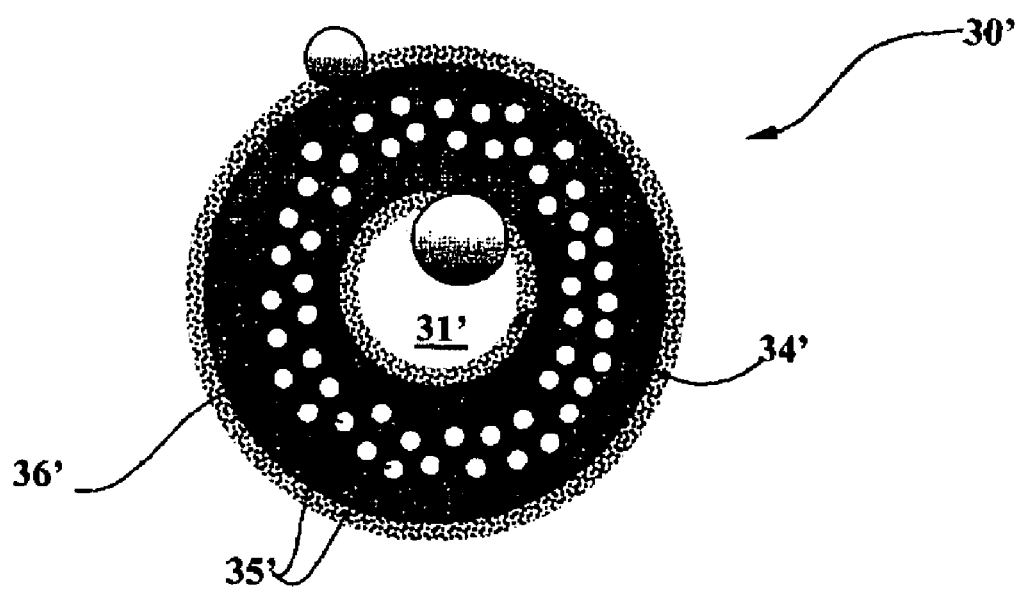
FIG. 3B is a cross-sectional view of a microfibrous direct methanol fuel cell element incorporating a fiber-reinforced hollow membrane separator, according to one embodiment of the present invention.

FIGS. 3A and 3B illustratively show two alternative embodiments of the microfibrous direct methanol fuel cell of the present invention. Specifically, FIG. 3A provides a cross-sectional view of a microfibrous DMFC 30 having a microfibrous hollow membrane separator 36 that contains a continuous strand of reinforcing fibers therein, wherein such strand is formed by twisting or otherwise tightly packing multiple continuous fibers 35 together. FIG. 3B, on the other hand, shows the cross-sectional view of another microfibrous DMFC 30' having a microfibrous hollow membrane separator 36' containing multiple reinforcing fibers 35 scattered around its membrane wall, while each fiber is spaced apart from adjacent fibers, allowing protons to pass through the membrane separator 36' from between the fibers. Therefore, such continuous fibers advantageously improve the dimensional stability and tensile strength of the membrane separator 36, without compromising its ionic conductivity.

FIGS. 3A and 3B are provided herein for illustration purposes only and should not be construed to limit the broad scope of the present invention. The configurations and embodiments of the microfibrous direct methanol fuel cell as illustrated hereinabove can be readily modified by a person ordinarily skilled in the art, consistent with the principles disclosed herein and without undue experimentation. In actual practice, the continuous fibers can be arranged in any manner, as long as they align parallelly or substantially parallelly with the longitudinal axis of the fuel cell and allow protons to pass between the bore and the shell sides of the membrane separator with little or no resistance.

The above-described fiber-reinforced microfibrous hollow membrane structures and microfibrous DMFCs incorporating the same can be readily fabricated by methods described in U.S. Pat. No. 7,358,545 issued Apr. 8, 2008 for "SUBSTRATE-SUPPORTED PROCESS FOR MANUFACTURING MICROFIBROUS FUEL CELLS" and presently copending U.S. patent application No. 10/811,347 filed on Mar. 26, 2004 for "PROCESS FOR MANUFACTURING HOLLOW FIBERS," the contents of which are incorporated herein by reference in their entireties for all purposes.

Specifically, the fiber-reinforced microfibrous hollow membrane structure can be formed by: (1) providing a removable microfibrous substrate having a longitudinal axis; (2) providing one or more continuous fibers and a polymeric membrane-forming composition; (3) forming over the microfibrous substrate a polymeric membrane-forming composition layer having one or more continuous fibers embedded therein, wherein such continuous fibers are arranged substantially parallel to the longitudinal axis of the microfibrous substrate; (4) treating the polymeric membrane-forming composition layer to form a polymeric membrane wall having one or more continuous fibers embedded therein; and (5) removing the removable microfibrous substrate from within the polymeric membrane wall, to form a microfibrous hollow membrane structure having reinforcing fibers embedded in its membrane wall.

The removable microfibrous substrate as mentioned hereinabove may comprise a microfiber formed of one or more removable substrate materials, such as polyvinyl pyrrolidones (PVP), polyvinyl alcohols (PVA), polyethylene glycols (PEG), which are all water-soluble polymers that can be subsequently removed by dissolution in water. Such removable microfibrous substrate may also be formed by covering a solid core fiber (such as a metal fiber, a carbon fiber, a glass fiber, or a polymeric fiber formed of non-water-soluble polymer) with a layer of the above-described removable substrate materials, so by subsequently removing the removable substrate material layer, the solid core fiber is released and can then be easily extracted from within the polymeric membrane wall. Further, when the polymeric membrane wall of the microfibrous hollow membrane structure to be formed comprises a swellable ion exchange polymer such as Nafion, the removable microfibrous substrate may comprise an uncovered solid core fiber, such as a metal fiber, a carbon fiber, a glass fiber, or a non-water-soluble polymeric fiber. Subsequently release of such uncovered solid core fiber from the polymeric membrane wall is effectuated by contacting such polymeric membrane wall with a swelling agent (such as water), to cause radial expansion of the membrane wall and corresponding detachment of the membrane wall from the solid core fiber. For more details regarding the removable microfibrous substrates and corresponding methods of extraction, please see U.S. Pat. No. 7,354,545 and presently copending U.S. patent application Ser. No. 10/811,347.

The continuous fibers can be co-extruded with a polymeric membrane-forming composition to form the fiber-containing polymeric membrane-forming composition layer.

Figure 4:
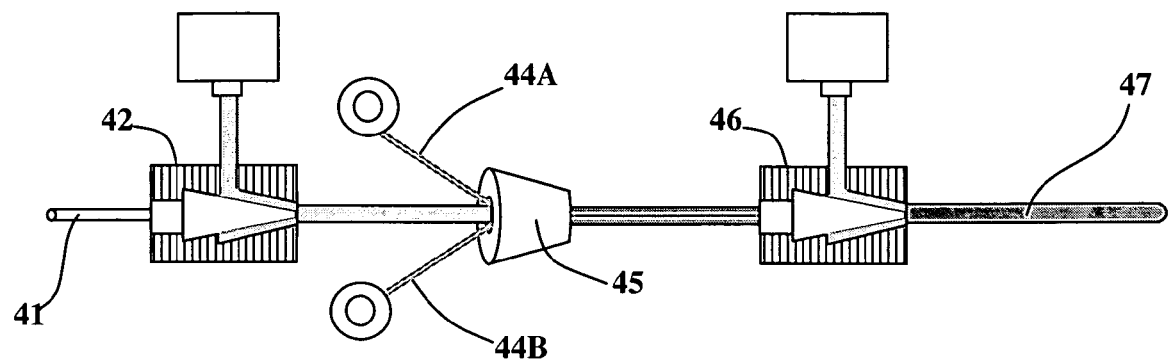
FIG. 4 illustrates a process for incorporating continuous fibers into a polymeric membrane-forming composition layer formed over a fibrous substrate, according to one embodiment of the present invention.

Alternatively, such fiber-containing polymeric membrane-forming composition layer can be formed by (a) applying a first layer of the polymeric membrane-forming composition over the removable microfibrous substrate, (b) arranging the continuous fibers on top of the first layer along the longitudinal axis of the microfibrous substrate, and (c) applying a second layer of the polymeric membrane-forming composition cover the continuous fibers and the first layer, so that the first and second layers combine into one polymeric membrane-forming layer with the continuous fibers embedded therein. FIG. 4 specifically depicts a process for encapsulating continuous fibers into a polymeric membrane-forming composition layer that are formed by two sequentially fabricated membrane-forming layers. Specifically, a removable microfibrous substrate 41 is provided and passed through a first extrusion die 42 for extrusion of a first layer of a polymeric membrane-forming composition. Two continuous fibers 44A and 44B are applied onto such first layer by an applicator die 45, and a second layer of a polymeric membrane-forming composition is then extruded by a second extrusion die 46 to overlay both the continuous fibers and the first layer, forming an extruded fiber 47. Such extruded fiber 47 comprises the original microfibrous substrate 41 covered by a polymeric membrane-forming composition layer, which is formed by the overlaying first and second polymeric membrane-forming layers with the continuous fibers encapsulated therebetween.

In another embodiment of the present invention, one or more continuous fibers are first fabricated into a fiber-reinforced membrane structure having a ribbon-like configuration, which contains multiple unidirectional or substantially unidirectional continuous fibers embedded in a polymeric membrane matrix, and such ribbon-like fiber-reinforced membrane structure is then used for forming the microfibrous hollow membrane structure.

Figure 5:
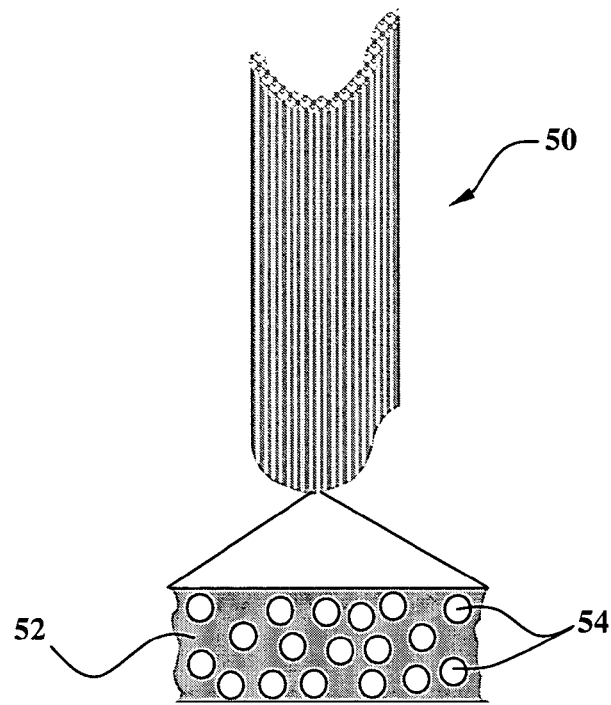
FIG. 5 is an illustrative view of a fiber-reinforced membrane structure having a ribbon-like configuration, according to one embodiment of the present invention.

FIG. 5 illustratively shows a ribbon-like membrane structure 50 that comprises a polymeric membrane matrix 52 having multiple continuous fibers 54 embedded therein, while such continuous fibers 54 are substantially parallel to one another. When such ribbon-like membrane structure is used for forming the ion-exchange membrane separator of a microfibrous DMFC as described hereinabove, interstitial spaces are provided between the fibers and filled with ion exchange polymeric material filling such interstitial spaces.

Such ribbon-like membrane structure can be formed by using a polymeric solution as a binding composition to bind multiple continuous fibers together. FIG. 6 depicts a process for forming such ribbon-like membrane structure, according to a specific embodiment of the present invention. A tow of continuous fibers 62 is aligned and concurrently passed through rollers 64 with a polymeric membrane forming composition 63, to form a continuous ribbon-like polymeric membrane precursor 65. The polymeric membrane precursor 65 is subsequently passed through a heating/drying zone 66 to form a ribbon-like membrane structure 67 having multiple continuous fibers embedded therein, which is collected by a spool 68.

One or more such ribbon-like fiber-reinforced membrane structures can then be applied onto the removable microfibrous substrate to form the fiber-reinforced polymeric membrane wall of the microfibrous hollow membrane structure, as described hereinabove. Because all the continuous fibers of such ribbon-like fiber-reinforced membrane structures are parallel or substantially parallel to one another, such ribbon-like fiber-reinforced membrane structures can easily conform to the microfibrous contour of the removable substrate, by aligning the continuous fibers in the membrane structure with the longitudinal axis of the microfibrous substrate. FIG. 7A shows the use of one ribbon-like fiber-reinforced membrane structure to form a fiber-reinforced polymeric membrane wall over a microfibrous substrate 72, while FIG. 7B shows the use of two such ribbon-like membrane structures 74A' and 74B' for forming the fiber-reinforced membrane wall over a microfibrous substrate 72'. More than two ribbon-like membrane structures can also be used without limitation. Further, a binding composition that comprises a solution of a polymeric membrane-forming material can be used to bind such ribbon-like membrane structure(s) onto the microfibrous substrate, and one or more layers of polymeric membrane-forming composition can be applied over such ribbon-like membrane structure(s) to form a polymeric membrane wall of increased thickness.

Microfibrous DMFCS with Two Microfibrous Hollow Membranes

Another aspect of the present invention relates to a microfibrous direct methanol fuel cell structure having a double-membrane configuration, which comprises a first and a second microfibrous hollow membrane structures, wherein the first microfibrous hollow membrane structure comprises ion exchange polymer and is used as membrane separator for isolating an anode from a cathode, and wherein the second microfibrous hollow membrane structure provides a fluid passage for controlled delivery of the methanol-containing fuel fluid.

Figure 8:
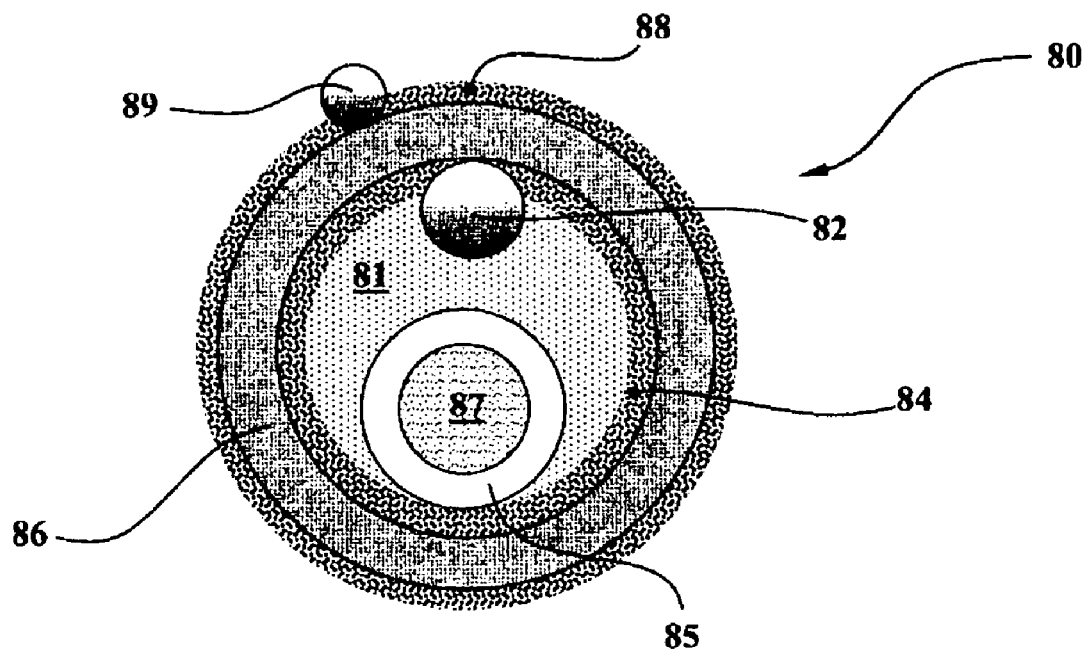
FIG. 8 is a cross-sectional view of a microfibrous direct methanol fuel cell element having a microfibrous hollow membrane structure with a semipermeable membrane wall at its bore side for controlled methanol delivery, according to one embodiment of the present invention.

Referring to FIG. 8, a microfibrous direct methanol fuel cell 80 comprises a first fibrous hollow membrane 86 and a second fibrous hollow membrane 85.

The first fibrous hollow membrane 86 comprises one or more ion exchange polymeric materials and therefore functions as an ion exchange membrane separator. Bore side of such first fibrous hollow membrane 86 contains an inner current collector 82 and an inner electrocatalyst layer 84 that is in contact with the inner current collector 82 and an inner surface of the first fibrous hollow membrane 86, while shell side of such first fibrous hollow membrane 86 contains an outer current collector 89 and an outer electrocatalyst layer 88 that is in contact with the outer current collector 89 and an outer surface of the first fibrous hollow membrane 86. An inner fluid passage 81 is provided at the bore side of such first fibrous hollow membrane 86 and between the inner current collector 82 and inner electrocatalyst layer 84.

The second fibrous hollow membrane 85 is disposed at the bore side of the first fibrous hollow membrane 86, and it encloses an additional fluid passage 87 that is separated from the inner fluid passage 81. A methanol-containing fuel fluid, such as a methanol/water solution, can be supplied through such additional fluid passage 87. The membrane wall of the second fibrous hollow membrane 85 isolates such methanol-containing fuel fluid from the rest of the microfibrous DMFC cell, so as to achieve controlled delivery of the methanol-containing fuel fluid.

Specifically, the membrane wall of the second fibrous hollow membrane 85 allows only a portion of the methanol-containing fuel fluid to diffuse through, thereby forming a methanol concentration differential across the membrane wall, in which the methanol concentration outside of the membrane wall (i.e., in the inner fluid passage 81) is lower than the methanol concentration inside of the membrane wall (i.e., in the additional fluid passage 87).

In this manner, the membrane separator 86 is effectively isolated from the high-concentration methanol fuel fluid in the additional fluid passage 87, while it still has access to the low-concentration methanol fuel fluid in the inner fluid passage 81, which significantly reduces methanol crossover through such membrane separator 86. Therefore, concentrated methanol fuel solutions (i.e., containing methanol at 30 wt % or more) can be directly used with the microfibrous DMFCs of the present invention, without further dilution or modification otherwise.

Another important advancement of the present invention is the successful isolation of carbon dioxide gas, an electrochemical reaction byproduct, from the high-concentration methanol fuel fluid. In conventional direct methanol fuel cells, carbon dioxide gas generated by the anodic electrochemical reaction between methanol and water is mixed with the methanol-containing fuel fluid supplied at the anode and has to be discharged with such methanol-containing fuel fluid. In contrast, the direct methanol fuel cell 80 of the present invention as described hereinabove supplies high-concentration methanol fuel fluid through the additional fluid passage 87, while the carbon dioxide gas is collected in the inner fluid passage 81 that is isolated from the additional fluid passage 87, thereby allowing separate discharge of the carbon dioxide from the high-concentration methanol fuel supply and increasing the cell efficiency.

The second microfibrous hollow membrane as described hereinabove may comprises a microporous membrane, a semipermeable membrane, or a composite membrane that contains both microporous and semipermeable components.

The term "microporous" as used herein defines a porous structure having an average pore size in a range of from about 1 Angstrom to about 100 microns, more preferably from about 1 Angstrom to about 10 microns, and most preferably from about 5 Angstrom to about 5 microns.

The term "semipermeable" as used herein defines a non-porous structure that is selectively permeable to certain molecules (e.g., water and methanol) through sorption and diffusion of such molecules through the structure.

For example, the second microfibrous hollow membrane 85 in FIG. 8 may comprise a semipermeable membrane formed of an ion exchange polymer, such as a perflurocarbon-sulfonic-acid-based polymer, a polysulfone-based polymer, a perfluorocarboxylic-acid-based polymer, a styrene-vinyl-benzene-sulfonic-acid-based polymer, and a styrene-butadiene-based polymer. In a particularly preferred embodiment, a perfluorosulfonic-acid-based polymer, such as Nafion® manufactured by E. I. Dupont, is used to form the second microfibrous hollow membrane.

Figure 9:
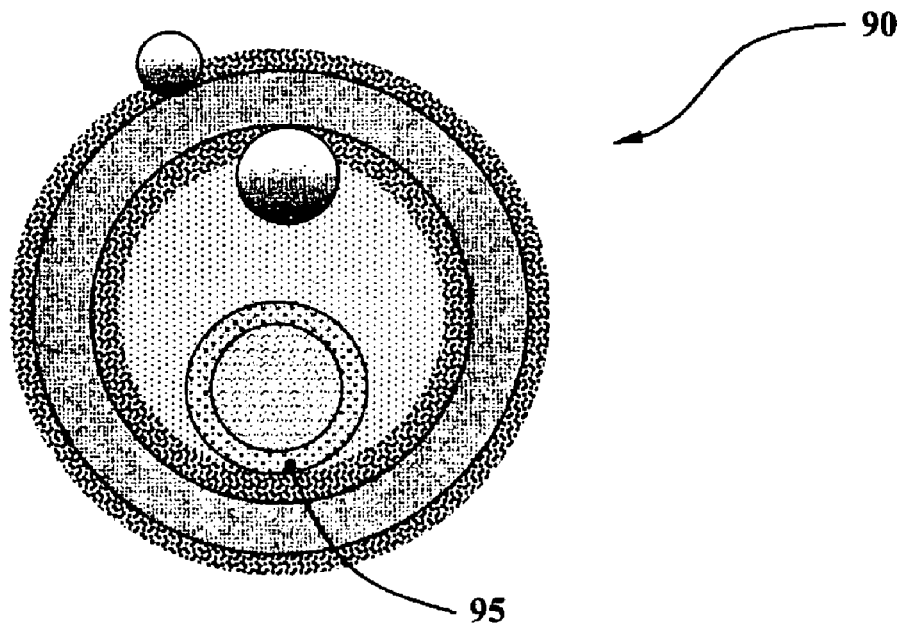
FIG. 9 is a cross-sectional view of a microfibrous direct methanol fuel cell element having a microfibrous hollow membrane structure with a microporous membrane wall at its bore side for controlled methanol delivery, according to one embodiment of the present invention.

Alternatively, such second microfibrous hollow membrane may comprise a microporous membrane having an average pore size of from about 1 Angstrom to about 10 microns, which can be categorized as ultrafiltration membrane, microfiltration membrane, or reverse osmosis membrane, depending on the pore size. A microfibrous direct methanol fuel cell 90 comprising a second microfibrous hollow membrane 95 with a microporous membrane wall is illustrated in FIG. 9.

Figure 10:
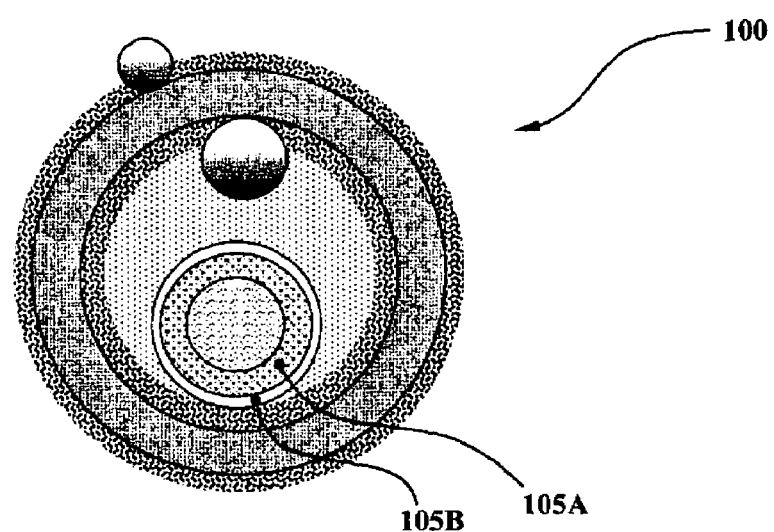
FIG. 10 is a cross-sectional view of a microfibrous direct methanol fuel cell element having a microfibrous hollow membrane structure with a composite membrane wall at its bore side for controlled methanol delivery, according to one embodiment of the present invention.

Further, such second microfibrous hollow membrane may comprise a composite membrane having a microporous membrane with a semipermeable coating thereon. See FIG. 10, the microfibrous direct methanol fuel cell 100 contains a second microfibrous hollow membrane formed of a microfibrous membrane 105A with a semipermeable coating 105B thereon.

In an alternative embodiment of the present invention, the second microfibrous hollow membrane is disposed at the shell side of the membrane separator for controlled delivery of the methanol fuel fluid to the shell side of such membrane separator.

Figure 11:
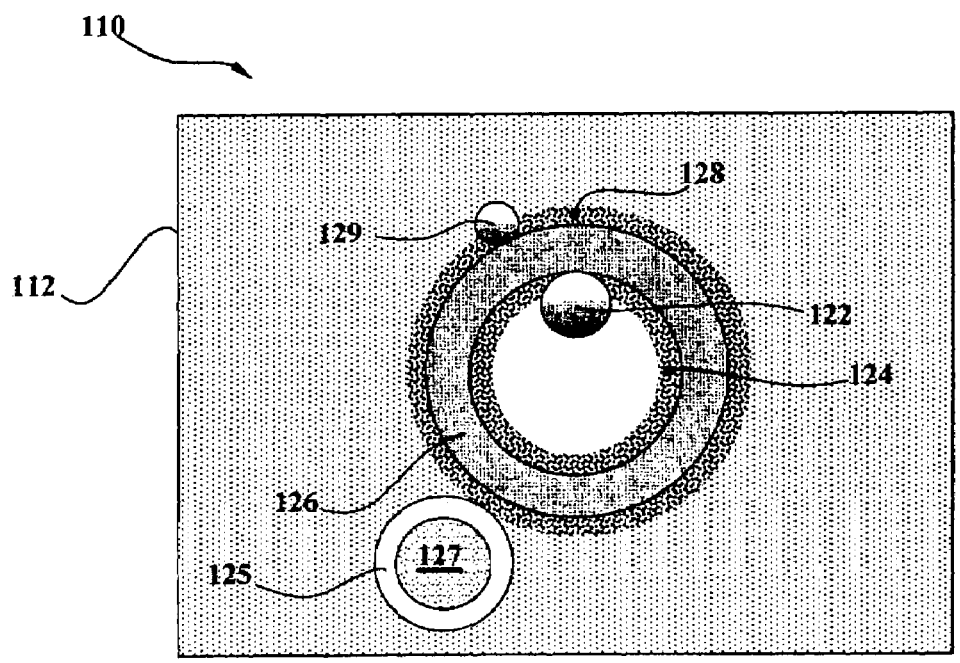
FIG. 11 is a cross-sectional view of a microfibrous direct methanol fuel cell element disposed in a leak-tightly sealed housing, wherein such fuel cell element has a microfibrous hollow membrane structure with a semipermeable membrane wall at its shell side for controlled methanol delivery, according to one embodiment of the present invention.

FIG. 11 shows an illustrative microfibrous direct fuel cell 110, which is placed in a leak-tightly sealed housing 112 that comprises at least one fluid inlet and at least one fluid outlet (not shown).

The microfibrous direct methanol fuel cell 100 comprises a first fibrous hollow membrane 126 and a second fibrous hollow membrane 125.

The first fibrous hollow membrane 126 comprises one or more ion exchange polymeric materials and therefore functions as an ion exchange membrane separator. Bore side of such first fibrous hollow membrane 126 contains an inner current collector 122 and an inner electrocatalyst layer 124 that is in contact with the inner current collector 82 and an inner surface of the first fibrous hollow membrane 126, while shell side of such first fibrous hollow membrane 126 contains an outer current collector 129 and an outer electrocatalyst layer 128 that is in contact with the outer current collector 129 and an outer surface of the first fibrous hollow membrane 126. An inner fluid passage 121 is provided at the bore side of such first fibrous hollow membrane 126 and between the inner current collector 122 and inner electrocatalyst Layer 124.

The second fibrous hollow membrane 125 is disposed at the shell side of the first fibrous hollow membrane 126, and it encloses an additional fluid passage 127 that is separated from the inner fluid passage 121. A methanol-containing fuel fluid, such as a methanol/water solution, can be supplied through such additional fluid passage 127. The membrane wall of the second fibrous hollow membrane 125 isolates such methanol-containing fuel fluid from the rest of the microfibrous direct methanol fuel cell 110, so as to achieve controlled delivery of the methanol-containing fuel fluid.

Specifically, the membrane wall of the second fibrous hollow membrane 125 allows only a portion of the methanol-containing fuel fluid to diffuse through, thereby forming a methanol concentration differential across the membrane wall, in which the methanol concentration outside of the membrane wall (i.e., in the leak-tightly sealed housing 112) is lower than the methanol concentration inside of the membrane wall (i.e., in the additional fluid passage 127).

In this manner, the membrane separator 126 is effectively isolated from the high-concentration methanol fuel fluid in the additional fluid passage 127, while it still has access to the low-concentration methanol fuel fluid in the leak-tightly sealed housing 112 outside of such additional fluid passage 127, which significantly reduces methanol crossover through such membrane separator 126. Further, carbon dioxide gas generated during the operation is collected in the leak-tightly sealed housing 112 outside of the additional fluid passage 127, thereby allowing separate discharge of the carbon dioxide through the inlet and outlet of the housing 112.

Such alternative embodiment as described hereinabove can be further modified to form a direct methanol fuel cell assembly comprising multiple microfibrous direct methanol fuel cells and one or more fuel delivery passages for controlled delivery of a high-concentration methanol fuel fluid.

Figure 12:
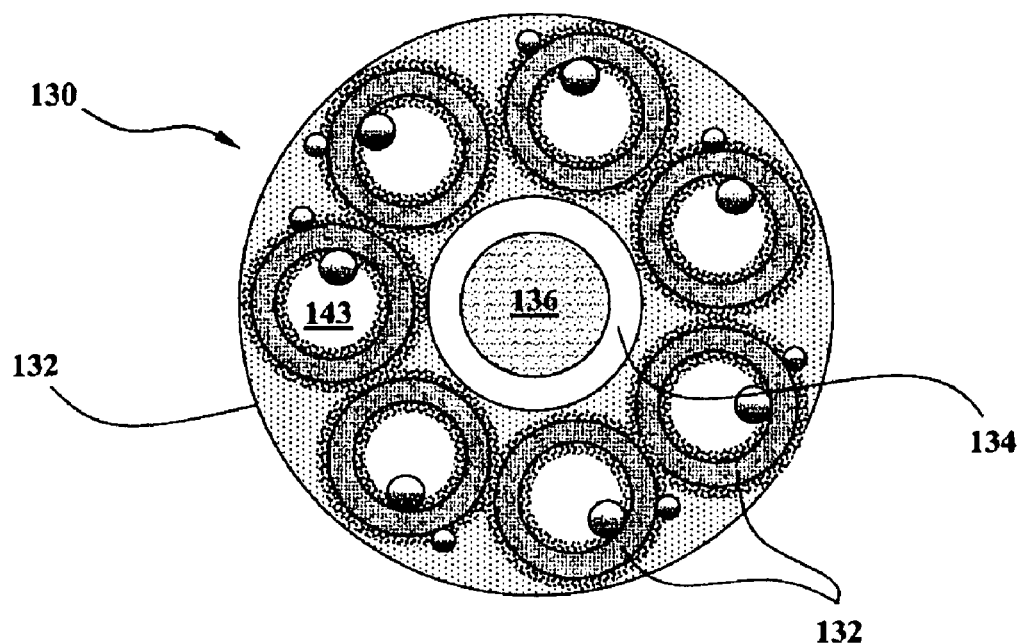
FIG. 12 is a cross-section view of a direct methanol fuel cell assembly that comprises multiple microfibrous direct methanol fuel cells disposed in a leak-tightly sealed housing, wherein a microfibrous hollow membrane structure with a semipermeable membrane wall is concurrently disposed in such housing for controlled methanol delivery, according to one embodiment of the present invention.

Specifically, FIG. 12 illustratively shows such a direct methanol fuel cell assembly 130, which comprises a leak-tightly sealed housing 132 with fluid inlet/outlet (not shown) and multiple microfibrous direct methanol fuel cell elements 132 disposed therein. Each fuel cell element 132 comprises a microfibrous hollow membrane separator, an inner current collector, an inner electrocatalyst layer, an outer current collector, and an outer electrocatalyst layer, while an inner fluid passage 143 is provided at the bore side of each fuel cell element 132 between its inner current collector and its inner electrocatalyst layer for delivery of an oxygen-containing fluid.

A microfibrous hollow membrane structure 134 is disposed in the housing 132 to provide an outer fluid passage 136 that is separate from the inner fluid passages of the fuel cell elements 132, for controlled delivery of a methanol-containing fuel fluid. The membrane wall of such microfibrous hollow membrane structure 134 allows only a portion of the methanol-containing fuel fluid to diffuse through and forms a methanol concentration differential across such membrane wall. Specifically, the methanol concentration outside of the membrane wall (i.e., in the leak-tightly sealed housing 132) is lower than the methanol concentration inside of the membrane wall (i.e., in the outer fluid passage 136).

In this manner, the membrane separators of the microfibrous fuel cell elements 132 are effectively isolated from the high-concentration methanol fuel fluid in the outer fluid passage 136, while retaining access to the low-concentration methanol fuel in the leak-tightly sealed housing 132 outside of such outer fluid passage 136, which significantly reduces methanol crossover through such membrane separators. Further, carbon dioxide gas generated by such multiple microfibrous fuel cell elements 132 during the operation is jointly collected in the leak-tightly sealed housing 132 and can be separately discharged through the inlet and outlet of the housing 132.

The following examples are provided hereinafter regarding fabrication of fibrous direct methanol fuel cells with fiber-reinforced membrane separators and/or double-membrane structures, according to preferred embodiments of the present invention:

EXAMPLE I

This example illustrates fabrication of fiberglass-reinforced Nafion® hollow fibers.

A first Nafion® layer was extruded onto a 0.020" OD 304 stainless steel wire core, dried and collected onto a spool. A second Nafion® layer was subsequently extruded on top of the first Nafion® layer, with a fiberglass yarn being incorporated between such two Nafion® layers. The resulting fiberglass-reinforced Nafion® hollow fibers displayed tensile strength approximately 7 times greater than that of the typical Nafion® hollow fibers, and negligible axial or longitudinal expansion upon contact with water.

Specifically, a first Nafion® dispersion extrudate containing 38.5 wt % Nafion® was obtained by evaporating a 20 wt % Nafion® 1100EW dispersion (DuPont Fluoroproducts, Fayetteville, N.C.) in a mixture of alcohols and water. Such 38.5% Nafion® dispersion extrudate had a shear viscosity of about 1800 Poise, as measured with a rotational viscometer (Brookfield LVT model) with a #4 spindle at 3 rpm and ambient conditions. It was extruded onto the 0.020" OD 304 stainless steel wire core. The first extrusion process was performed at ambient conditions of 25° C. and 16% relative humidity. The first Nafion® membrane layer so formed was dried online by a forced convection hot air tube of about 1 meter long.

A second Nafion® dispersion extrudate containing about 37.5 wt % Nafion® was also obtained via evaporation as described hereinabove, such second extrudate having a shear viscosity of about 1260 Poise at 3 rpm.

A bobbin of fiberglass yarn (identified as product "G37 1/0 1.0Z 690/31") was obtained from PPG Industries (Lexington, N.C.). The yarn consisted of approximately 800 filaments having 11 μm OD.

The second extrusion process was performed at ambient conditions of 24° C. and 19% relative humidity. The fiberglass yarn and the wire core coated with the first Nafion® membrane layer were concurrently fed through the hypotube of a sleeving extrudate die. The 37.5 wt % Nafion® dispersion extrudate was then extruded from the die to encapsulate the fiberglass yarn and the coated wire core.

An applied tension forced the fiberglass yarn to lay flat against the extruded fiber and to cover a significant portion of the circumference of such fiber. Fibers without the fiberglass yarn were also formed for comparison. The fiberglass-reinforced Nafion® membrane structure was dried online by a medium wave IR dryer of about 1 meter long, collected onto a spool and then cut into 12-inch-long fibers. The fibers were then heat-treated sequentially at: (1) 70° C. for 15 minutes, (2) 100° C. for 15 minutes, and (3) 120° C. for 1 hour, and subsequently immersed into water at room temperature for about 10-20 minute, which caused the Nafion® membrane layers to swell along their radial directions and became detached from the 0.020" wire cores. The detached 0.020" wire cores were then extracted to from hollow Nafion® fibers with fiberglass embedded therein.

The extrusion parameters and fiber properties are specified in Table I below:

TABLE I

| | 1st Nafion ® layer | 2nd Nafion ® layer | |
|---|---|---|---|
| Extrudate | Nafion ®- 38.5 wt % | Nafion ®- 37.5 wt % | |
| Die Configuration | | Sleeving | Sleeving |
| Extrusion Die Hole | | 0.064" | 0.075" |
| Hypo-tube ID × OD | | 0.033" × 0.0425" | 0.052" × 0.059" |
| | | w/o fiberglass | with fiberglass |
| Extrusion Rate (mL/min) | 0.26 | 0.35 | 0.6 |
| Dryer Set Point Temp. (° C.) | 110 (Hot Air Dryer) | 375 (IR Dryer) | 375 (IR Dryer) |
| Line Speed (m/min) | 1.0 | 0.5 | 0.5 |
| Wall Thickness (μm) | 51 | 120 | 125-395 |
| OD (μm) | 597 | 747 | 930 |
| ID (μm) | 495 | 492 | 485 |
| Axial Swelling (%) | 6 ± 2 | 7 ± 1 | <0.5 |
| Strain at Break (%) | 100 | 200 | ~8 |
| Tensile Strength (psi) | 2,500 | 3,400 | >24,800 |

The wall thickness, outer diameter (OD) and inner diameter (ID) of the Nafion® hollow fibers were determined by cross-sectional microscopic examination of such hollow fibers. There were up to 10 μm discrepancy between the given wall thickness and that calculated by subtracting the ID from the OD, since the wall was examined under a higher magnification (40×), while the diameters were measured at a relatively lower magnification (10×). The imbedded fiberglass yarn covered approximately ¼ of the circumference of each hollow fiber so formed, and increased the wall thickness of such fiber.

Ten 12-inch-long fiberglass-reinforced Nafion® hollow fibers were tested for axial (or longitudinal) swelling and tensile properties. The difference between the dry and wet lengths of the fiberglass-reinforced Nafion® hollow fibers were within 2 mm, or 0.5% of the total length, while the pure Nafion® hollow fibers typically swelled about 20 mm, or 6-7% of the total length.

Two of the ten fiberglass-reinforced Nafion® hollow fibers overloaded the 20-pound test cell of a Com-Ten Industries, 95 Series tensile tester with an effective gauge length of 4 inches and a strain rate of 100% per minute. The remaining eight fibers were averaged to provide the strain and strength data shown in Table I hereinabove. The typical maximum load of a fiberglass-reinforced Nafion® hollow fiber was about 18-19 lbs of force. The fiberglass yarn alone held a maximum load of 16-18 lbs with a 5% strain at break.

EXAMPLE II

This example illustrates fabrication of direct methanol fuel cells with fiberglass-reinforced hollow fibrous membrane separators. The extrusion process for applying the electrocatalyst coating and the membrane separator layer has been extensively described in U.S. Pat. No. 7,354,545 and presently copending U.S. patent application Ser. No. 10/811,347.

The fabrication of fiberglass-reinforced hollow fiber membrane separators useful for forming direct methanol fuel cells consists of the following three steps:

1. Forming an Inner Electrocatalyst Layer Over a Wire Core

An inner electrocatalyst layer was formed by coating a catalyst ink onto an inner current collector formed of a titanium wire core having a 500 μm outer diameter (OD). The catalyzed titanium wire was heat-set sequentially at 70° C. and 160° C. The thickness of the catalyst coating layer was approximately 10-15 μm. The catalyst ink contained Pt—Ru black (50:50 by atomic weight ratio) and Nafion® as a binding material. The Nafion® content in such catalyst ink was 15 wt %, and the Pt—Ru loading was 3-4 mg/cm². The Pt—Ru black (identified as product Hispec™6000) was purchased from Alfa Aesar (Ward Hill, Mass.). A 5 wt % Nafion® dispersion in a mixture of alcohols and water (EW1100, Solution Technologies, Mendenhall, Pa.) was used for the preparation of the catalyst ink.

2. Forming a Fiberglass-Reinforced Nafion® Membrane Separator

A first Nafion® layer was coated onto the catalyzed titanium wire by using a Nafion® dispersion containing 33 wt % Nafion® and dried at 70° C. A second Nafion® layer was subsequently coated on top of the first Nafion® layer, with a fiberglass yarn being incorporated between such two Nafion® layers, to form a fiber containing a fiberglass-reinforced Nafion® membrane separator. The resulting fiber containing such fiberglass-reinforced Nafion® membrane separator was dried at 70° C. for 60 minutes to remove the solvents in the membrane, and the final thickness of the fiberglass-reinforced membrane separator was approximately 170-180 µm.

Specifically, the Nafion® dispersion containing 33 wt % Nafion® was obtained by evaporating a 20 wt % Nafion® 1100EW dispersion (DuPont Fluoroproducts, Fayetteville, N.C.) in a mixture of alcohols and water. The fiberglass yarn (Product No. G37 1/0 1.0Z 690/31) was obtained from PPG Industries (Lexington, N.C.), which consisted of approximately 200 filaments.

3. Forming an Outer Electrocatalyst Layer

An outer electrocatalyst layer was formed by coating the catalyst ink of Pt black and Nafion® onto the fiber as prepared above, and then dried at 70° C. Nafion® content in such catalyst ink was 15 wt %, and Pt loading was approximately 3-4 mg/cm². Pt black (Product No. Hispec™1000) was purchased from Alfa Aesar (Ward Hill, Mass.). A 5 wt % Nafion® dispersion in a mixture of alcohols and water (EW1100, Solution Technologies, Mendenhall, Pa.) was used in the preparation of such catalyst ink.

The fiber so prepared was then cut to multiple sections of about 10" long, and heat-set sequentially at: (1) 70° C. for 60 minutes, (2) 105° C. for 30 minutes, and (3) 125° C. for 30 minutes, and subsequently immersed into hot water (about 80-100° C.) for 10-20 minutes, which caused the Nafion® membrane layers to swell along their radical directions and became detached from the 500 µm OD titanium wire. Such detached titanium wire was then extracted to form hollow fibrous Nafion® membrane separators with fiberglass embedded therein and with inner and outer electrocatalyst layers coated thereon. Such fiberglass-reinforced and catalyzed Nafion® membrane separators exhibited little to no change in their respective longitudinal dimensions during hydration and dehydration cycles.

In contrast, hollow fibrous Nafion® membrane separator that was fabricated in a similar manner but without fiberglass embedded therein expended significantly along the longitudinal axis. Incorporation of fiberglass into the hollow fibrous Nafion® membrane separator significantly reduced or eliminated such longitudinal dimension changes, because the fiberglass does not swell or otherwise change dimensions in water.

The fiberglass-reinforced and catalyzed Nafion® membrane separators as obtained above were cleaned to remove organic and inorganic impurities before they could be used to form direct methanol fuel cells. Such fibrous membrane separators were immersed in 3 vol % aqueous $H_2O_2$ solution at 60° C. for one hour to remove the organic impurities. After being rinsed with deionized water for a few times, the fibrous membrane separators were kept in a hot aqueous $H_2SO_4$ solution (1M) for 1-2 hours to remove inorganic impurities. Then the fibrous membrane separators were rinsed with deionized water for a few times and dried at 70° C. for 20-30 minutes. A Ti—Cu clad wire having an OD of approximately 380 µm was inserted into the bore of each fibrous membrane separator to function as an inner current collector, while another Ti—Cu clad wire of approximately 380 µm in OD was placed on the shell side of each fibrous membrane separator to function as an outer current collector, thereby forming complete direct methanol fuel cells (DMFCs). A Ti wire of approximately 200 µm in OD was used to wrap each DMFC and hold the inner current collector, the membrane separator, and the outer current collector together.

Figure 13:
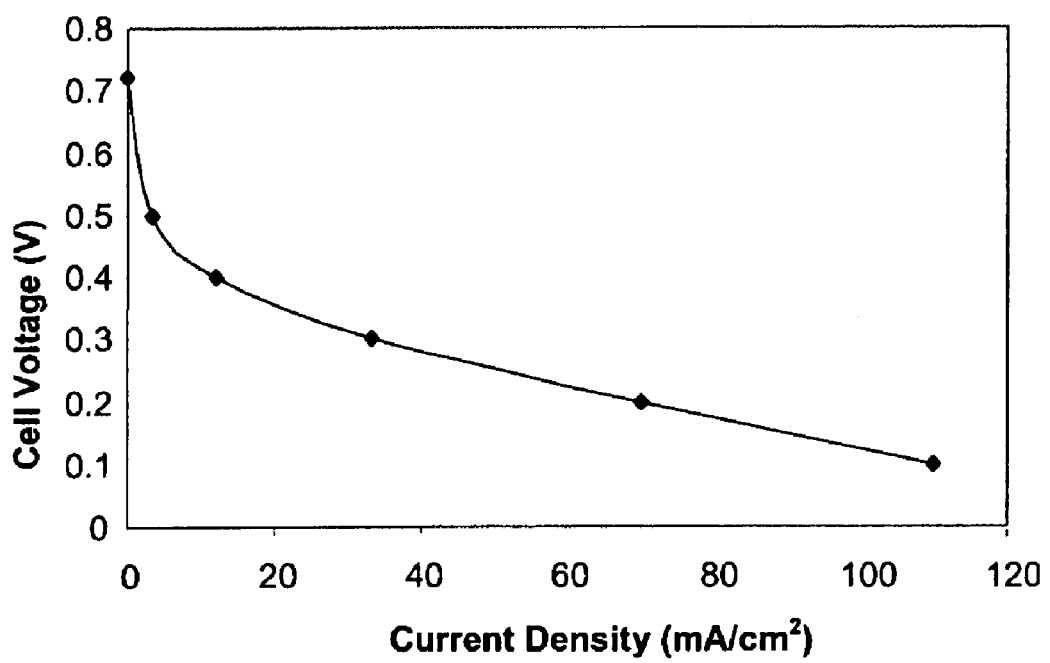
FIGS. 13-17 are polarization curves showing cell voltage of several direct methanol fuel cells according to various embodiments of the present invention measured as a function of current density.

The DMFCs so formed were tested at room temperature and in air-breathing mode. A 3.2 wt % aqueous methanol solution was pumped through the bore side of the fiberglass-reinforced hollow fibrous Nafion® membrane separators of such DMFCs at a rate of 0.04 cc/min. There was no discernible dimensional change in such DMFCs after the Nafion® membrane separator in each DMFC took up the methanol/water mixture and became hydrated. A polarization curve of cell voltage vs. current density of such DMFCs is shown in FIG. 13. The open circuit voltage was 0.72 V, and the cell voltage was 0.3 V at a current density of 33 mA/cm².

EXAMPLE III

This example illustrates testing of a direct methanol fuel cell containing a fiberglass-reinforced hollow fibrous membrane separator with a 16 wt % aqueous methanol solution passed therethrough.

A fibrous direct methanol fuel cell containing a fiberglass-reinforced hollow fibrous Nafion® membrane separator was prepared according to the procedure described in Example II hereinabove. A strand of fiberglass yarn comprising 200 filaments (Product No. G37 1/0 1.0Z 690/31) was embedded in the hollow fibrous Nafion® membrane separator and thereby reinforced the hollow fibrous membrane separator. The membrane thickness was approximately 180 µm.

When a 16 wt. % aqueous methanol solution was pumped through the bore of such fibrous direct methanol fuel cell at 0.04 cc/min, the cell showed no significant dimensional change along its longitudinal axis.

Figure 14:
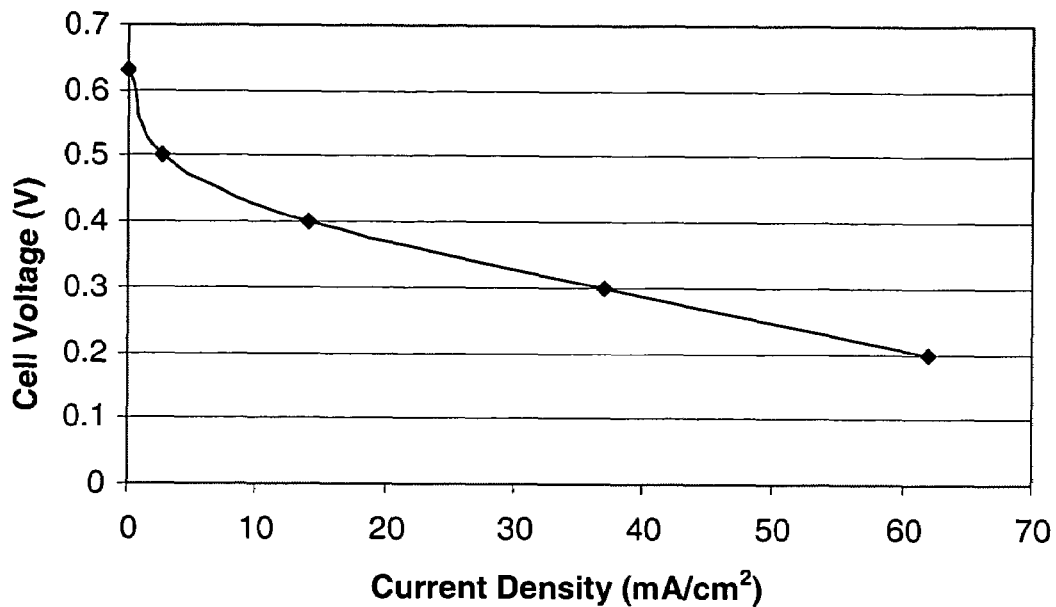

Such cell was tested at room temperature and in air-breathing mode. The polarization curve of such cell, which shows cell voltage as a function of current density, is provided in FIG. 14. The open circuit voltage with 16 wt % methanol solution was approximately 0.63 V. At a current density of 37 mA/cm², a steady cell voltage of 0.3 V was observed during the test.

A similar fibrous direct methanol fuel cell containing a hollow fibrous Nafion® membrane separator without fiberglass reinforcement typically cannot be tested with 16 wt % aqueous methanol solution, due to overheating and extremely low open cell voltage.

EXAMPLE IV

This example illustrates testing of a fibrous direct methanol fuel cell containing a fiberglass-reinforced Nafion® membrane separator with 6.4 wt % aqueous methanol solution.

A fibrous direct methanol fuel cell containing a fiberglass-reinforced hollow fibrous Nafion® membrane separator was prepared according to the procedure described in Example II hereinabove. A strand of fiberglass yarn comprising 200 filaments (Product No. G37 1/0 1.0Z 690/31) was embedded in a hollow fibrous Nafion® membrane separator and thereby reinforced such membrane separator. The membrane thickness is approximately 180 μm.

When a 6.4 wt. % aqueous methanol solution was pumped through the bore of such fibrous direct methanol fuel cell at 0.04 cc/min, the cell showed no significant dimensional change along its longitudinal axis.

Figure 15:
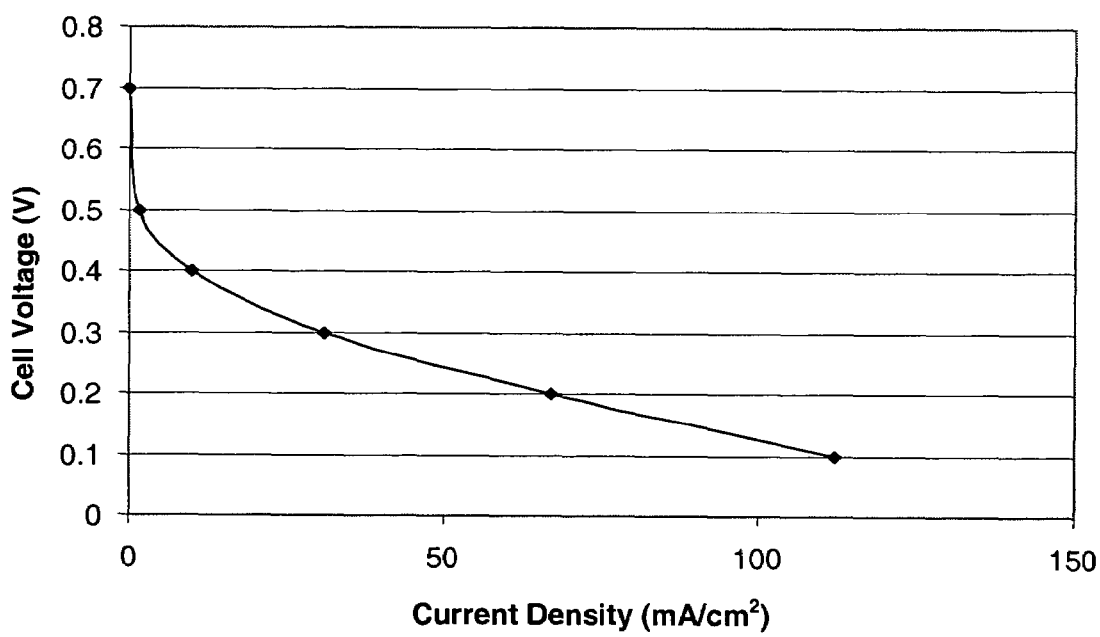

The fibrous cell was tested at room temperature and in air-breathing mode. The polarization curve of such cell showing the cell voltage as a function of the current density is provided in FIG. 15. The open circuit voltage with 6.4 wt % methanol solution was approximately 0.71 V. At the current density of 31 mA/cm$^2$, a steady cell voltage of 0.3 V was observed during the test.

EXAMPLE V

This example illustrates testing of a fibrous direct methanol fuel cell containing a Nafion® membrane separator reinforced by a fiberglass yarn that comprised 400 filaments.

A fibrous direct methanol fuel cell containing a fiberglass-reinforced hollow fibrous Nafion® membrane separator was prepared according to the procedure described in Example II hereinabove. A strand of fiberglass yarn comprising 400 filaments was embedded in a hollow fibrous Nafion® membrane separator to reinforce the hollow fiber. The membrane thickness is approximately 180 μm. Such fiberglass-reinforced hollow fibrous Nafion® membrane separator was more robust than Nafion® hollow fiber without any reinforcement and did not swell in water along its longitudinal axis.

When a 3.2 wt % aqueous methanol solution was pumped through the bore of such fibrous direct methanol fuel cell at 0.04 cc/min, the cell showed no significant dimensional change along its longitudinal axis. The fibrous cell was then tested at room temperature and in air-breathing mode. The open circuit voltage with 3.2 wt % aqueous methanol solution was 0.67 V. At a current density of 28 mA/cm$^2$, a steady cell voltage of 0.3 V was observed during the test.

EXAMPLE VI

This example illustrates testing of a fibrous direct methanol fuel cell containing a Nafion® membrane separator reinforced by two fiberglass yarns.

A fibrous direct methanol fuel cell containing a fiberglass-reinforced hollow fibrous Nafion® membrane separator was prepared according to the procedure described in Example II hereinabove. Two fiberglass yarns were embedded in a hollow fibrous Nafion® membrane separator and thereby reinforced the membrane separator. Each yarn comprised 400 microfilaments. The membrane thickness was 180 μm.

When a 3.2 wt. % aqueous methanol solution was pumped through the bore of such fibrous direct methanol fuel cell at 0.04 cc/min, there was no dimensional change along the longitudinal axis of such cell. The cell was then tested at room temperature and in air-breathing mode. The open circuit voltage with 3.2 wt % methanol solution is approximately 0.71 V. At the current density of 34 mA/cm$^2$, a steady cell voltage of 0.3 V was observed during the test.

EXAMPLE VII

This example illustrates testing of a fibrous direct methanol fuel cell containing a Nafion® membrane separator reinforced by two fiberglass yarns with 16 wt % aqueous methanol solution.

A fibrous direct methanol fuel cell containing a hollow fibrous Nafion® membrane separator with two fiberglass yarns was prepared according to the procedure described in Example II hereinabove. Two fiberglass yarns were embedded in a hollow fibrous Nafion® membrane separator to keep the membrane separator from swelling when it was hydrated. Each yarn consisted of 400 filaments. The membrane thickness was 180 μm.

When a 16 wt % aqueous methanol solution was pumped through the bore of the fibrous direct methanol fuel cell at 0.04 cc/min, the cell showed no significant dimensional change along its longitudinal axis. The cell was tested at room temperature and in air-breathing mode. The open circuit voltage with 16 wt % methanol solution is approximately 0.65 V. At the current density of 25 mA/cm$^2$, a steady cell voltage of 0.3 V was observed during the test.

EXAMPLE VIII

This example illustrates testing of a fibrous direct methanol fuel cell containing a Nafion® membrane separator reinforced by two fiberglass yarns that each comprised 200 microfilaments.

A fibrous direct methanol fuel cell containing a hollow fibrous Nafion® membrane separator with two fiberglass yarns was prepared according to the procedure described in Example II hereinabove. Two fiberglass yarns were embedded in a hollow fibrous Nafion® membrane separator to reinforce the hollow fiber. The membrane thickness was 180 μm.

When a 16 wt % aqueous methanol solution was pumped through the bore of the fibrous direct methanol fuel cell at 0.04 cc/min, the cell showed no significant dimensional change along its longitudinal axis. The cell was tested at room temperature and in air-breathing mode. The open circuit voltage with 16 wt % methanol solution is approximately 0.63 V. The cell voltage is 0.3 V at a current density of 23 mA/cm$^2$.

EXAMPLE IX

This example illustrates testing of a module comprising ten (10) fibrous direct methanol fuel cells that each had a hollow fibrous Nafion® membrane separator reinforced by a fiberglass yarn.

Ten fibrous direct methanol fuel cells were prepared according to the procedure described in Example II hereinabove. A fiberglass yarn comprising 200 microfilaments was embedded in a hollow fibrous Nafion® membrane separator to form each cell. Such ten fibrous direct methanol cells were bundled around a titanium rod of approximately ⅛ inch in diameter, and then wrapped with a porous foam material of about ⅛' thick. In such a bundle structure, the fibrous fuel cells were allowed to have equal opportunity to access air and release heat/water generated during the fuel cell operation. Porous structure of the foam material enabled the fibrous cell to retain moisture in the module, which is important for humidification of the fibrous cells during the operation, while also allowing the diffusion of air.

Figure 16:
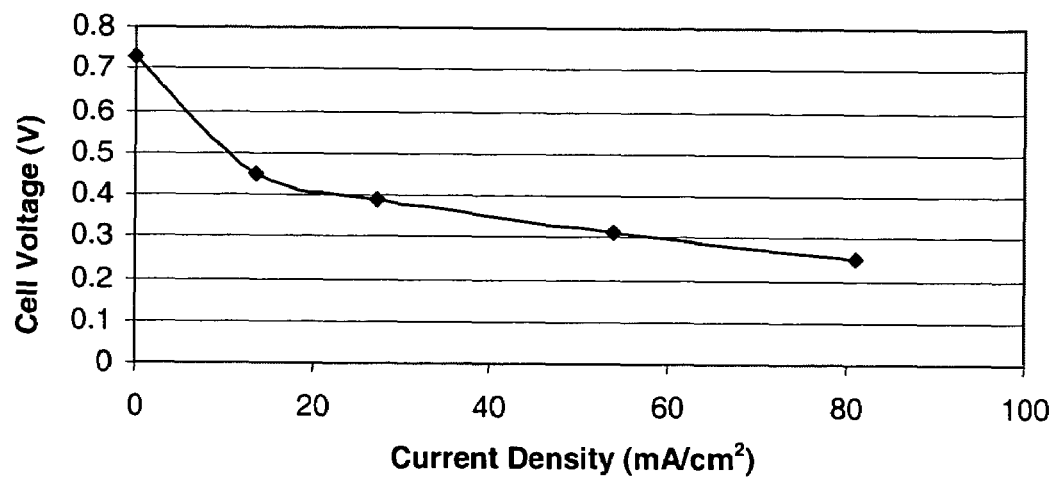

A 6.4 wt. % aqueous methanol solution was pumped through the bore of the fibrous cells at 0.4 cc/min. The cells were tested in air-breathing mode. During the test, the cell temperature rose to 50-55° C., due to heat generated by the fuel cells. The polarization curve of such fuel cell bundle showing cell voltage as a function of current density is provided in FIG. 16. The open circuit voltage with 6.4 wt % methanol solution was 0.73 V. At a current density of 27 mA/cm$^2$, a steady cell voltage of 0.39V was observed during the test. The fuel cell bundle was tested for 200 hours with negligible loss in performance.

EXAMPLE X

This example illustrates testing of a module comprising eleven (11) fibrous direct methanol fuel cells that each had a hollow fibrous Nafion® membrane separator reinforced by a fiberglass yarn.

Eleven fibrous direct methanol fuel cells were prepared according to the procedure described in Example II hereinabove. A fiberglass yarn comprising 200 microfilaments was embedded in a hollow fibrous Nafion® membrane separator to form each fiber. Eleven fibrous cells were bundled around a titanium rod of approximately ⅛ inch in diameter, and then wrapped with a porous foam material to form a fuel cell bundle.

Figure 17:
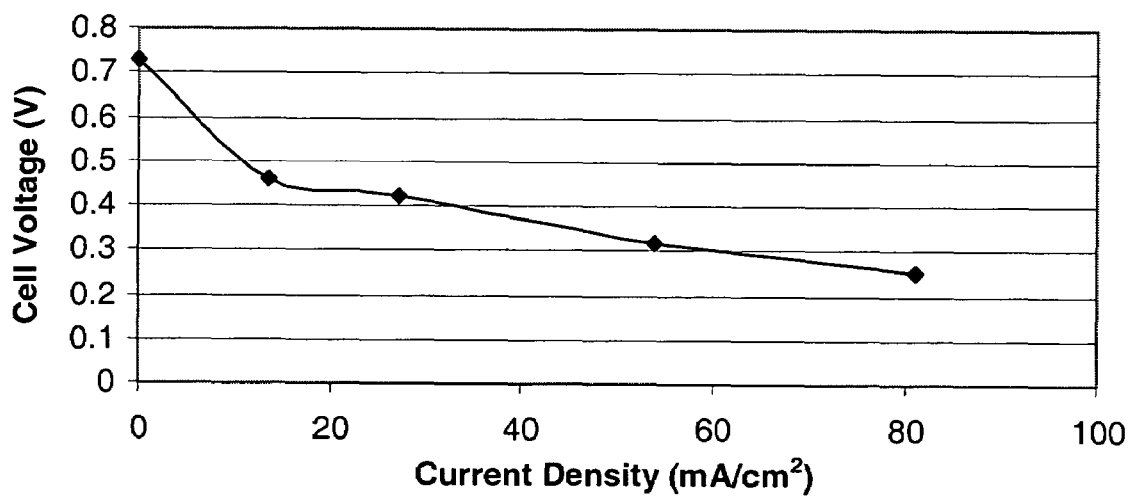

A 6.4 wt. % aqueous methanol solution was pumped through the bore of such fibrous fuel cells at 0.45 cc/min. The cells were tested in air-breathing mode. During the test, the cell temperature rose to 50-55° C., due to heat generated by the fuel cells. The polarization curve of such fuel cell bundle showing cell voltage as a function of current density is provided herein in FIG. 17. The open circuit voltage with 6.4 wt % methanol solution was 0.74 V. At the current density of 54 mA/cm$^2$, a steady cell voltage of 0.32 V was observed during the test. The module was continuously tested for 750 hours, with a performance loss of not more than 5%.

EXAMPLE XI

This example illustrates fabrication of a fibrous direct methanol fuel cell having a double-membrane structure with two hollow fibrous membranes therein.

The fabrication of a double-membrane structure consists of the following four steps:

1. Forming the Fuel-Delivering Element (i.e., the First Hollow Fibrous Membrane)

A polysulfone hollow fiber (5000 MWC, 500 μm inner diameter and 900 μm outer diameter) was coated with a 20 wt % Nafion® solution (Solution Technologies, EW1100, Mendenhall, Pa.) and dried in the air at room temperature for 10-20 minutes. Then the Nafion®-coated polysulfone hollow fiber was dried in an oven at 120° C. for 20-30 minutes. The coating and drying steps were repeated until the thickness of the Nafion® coating reached 30-40 μm.

The Nafion®-coated polysulfone hollow fiber functioned as the fuel-delivering element for controlled delivery of a methanol-containing fuel fluid to the fuel cell. The dense Nafion® coating layer on the microporous wall of the polysulfone hollow fiber enhanced its ability of methanol separation. The polysulfone hollow fiber was purchased from Amersham Bioscience (formerly AIG Technology Corporation, Needham, Mass.).

2. Forming an Inner Electrocatalyst Layer

An inner electrocatalyst layer was formed by coating a catalyst ink onto the shell side of the Nafion®-coated polysulfone hollow fiber. The catalyzed and Nafion®-coated polysulfone hollow fiber was heat-set sequentially at: (1) 70° C. for 30-40 minutes, and (2) 160° C. for 30 minutes. The thickness of the catalyst coating was 10-15 μm. The catalyst ink contained Pt—Ru black (50:50 by atomic weight ratio) and Nafion® as a binding material. The Nafion® content in such catalyst ink was 15 wt %, and the Pt—Ru loading was 34 mg/cm$^2$. The Pt—Ru black (Product No. Hispec™6000) was purchased from Alfa Aesar (Ward Hill, Mass.). A 5 wt % Nafion® dispersion in a mixture of alcohols and water (EW1100, Solution Technologies, Mendenhall, Pa.) was used for preparation of the catalyst ink. A titanium wire of approximately 200 μm OD was wrapped around the shell side of such catalyzed and Nafion®-coated polysulfone hollow fiber to function as an inner current collector for the fuel cell.

3. Forming the Hollow Fibrous Membrane Separator (i.e., the Second Hollow Fibrous Membrane)

The second hollow fibrous membrane functions as an ion-exchange hollow fibrous membrane separator for isolating the inner electrocatalyst layer from an outer electrocatalyst layer and for conducting protons therethrough. Nafion® is a membrane material widely used in forming the membrane separator for direct methanol fuel cells. A Nafion® layer containing 20 wt % Nafion® dispersion in a mixture of alcohols and water (1100EW, DuPont Fluoroproducts, Fayetteville, N.C.) was therefore coated onto the catalyzed and Nafion®-coated polysulfone hollow fiber with the 200 μm OD titanium wire wrapped therearound, and dried in an over at 70° C. for 10-20 minutes. The coating and drying steps were repeated until the titanium wire was completely covered by the Nafion® coating. The resulting fiber was dried in the oven at 70° C. for 60 minutes to remove the solvents in the Nafion® coating, thereby forming a Nafion® membrane separator. The final thickness of the Nafion® membrane is 200-250 μm.

4. Forming an Outer Electrocatalyst Layer

An outer electrocatalyst layer was formed by coating the catalyst ink of Pt black and Nafion® onto the shell side of the fiber prepared hereinabove. The catalyzed fiber was dries at 70° C. in the oven for 20-30 minutes. Nafion® content in the catalyst ink used hereby is 15 wt %, and Pt loading is 34 mg/cm$^2$. Pt black (Product No. Hispec™1000) was purchased from Alfa Aesar (Ward Hill, Mass.). A 5 wt % Nafion® dispersion in a mixture of alcohols and water (EW1100, Solution Technologies, Mendenhall, Pa.) was used for preparation of the catalyst ink.

The catalyzed fiber was heat-set sequentially at: (1) 70° C. for 60 minutes, (2) 105° C. for 30 minutes, and (3) 125° C. for 30 minutes. The fiber so obtained was then cleaned to remove organic and inorganic impurities. First, such fiber was immersed in a 3 vol % aqueous $H_2O_2$ solution at 60° C. for one hour to remove the organic impurities. After being rinsed with deionized water for a few times, the fiber was kept in hot aqueous $H_2SO_4$ solution (1M) for 1~2 hour to remove inorganic impurities. Then the fiber was rinsed with deionized water for a few times and dried at 70° C. for 20-30 minutes.

A titanium-copper clad wire of approximately 380 μm OD was placed against the shell side of the fiber so formed to function as an outer current collector. A titanium wire of approximately 200 μm OD was used to wrap the fiber and the outer current collector together, thereby forming a complete fibrous direct methanol fuel cell with a double-membrane structure.

Such fibrous direct methanol fuel cell with double-membrane structure was tested at room temperature and in air-breathing mode. A 16 wt % aqueous methanol solution was pumped through the bore side of the fuel-delivering element (i.e., the first hollow fibrous membrane) at low flow rate. Methanol from the aqueous methanol solution diffuses through the methanol-separating membrane wall of such fuel-delivery element to reach the inner electrocatalyst layer.

The open circuit voltage of such fibrous double-membrane fuel cell was 0.7 V with 16 wt % methanol solution. The relatively high open circuit voltage indicates that relatively lower methanol concentration was present in the inner electrocatalyst layer. No dimensional change was observed along the longitudinal axis of such fibrous fuel cell. Such cell generated a current density of 6 mA/cm² at 0.3 V.

EXAMPLE XII

This example illustrates testing of another fibrous direct methanol fuel cell with a double-membrane structure comprising a Nafion® hollow fiber as the membrane separator and a Nafion®-coated polysulfone hollow fiber as the fuel-delivering element.

Such fibrous direct methanol fuel cell was fabricated according to the procedure described in Example VII hereinabove, except that a polysulfone hollow fiber (500,000 MWC, 500 μm ID and 900 μm OD) was used for preparation of the Nafion®-coated polysulfone hollow fiber. Such polysulfone hollow fiber was purchased from Amersham Bioscience (formerly A/G Technology Corporation, Needham, Mass.).

Such fibrous direct methanol fuel cell was tested at room temperature and in air-breathing mode. A 16 wt % aqueous methanol solution was pumped through the bore of the hollow fibrous membrane separator at low flow rate. The open circuit voltage of such fibrous fuel cell was 0.55 V with 16 wt % methanol solution. Such double-membrane fibrous fuel cell generated a current density of 3 mA/cm² at 0.3 V.

EXAMPLE XIII

This example illustrates fabrication of a fibrous direct methanol fuel cell having a double-membrane structure with a fiberglass-reinforced Nafion® hollow fiber as the fuel-delivering element and a Nafion® hollow fiber as the membrane separator.

Such fibrous direct methanol fuel cell was prepared by the following steps:

1. Preparation of a Fiberglass-Reinforced Nafion® Hollow Fiber

A Nafion® dispersion containing 33 wt % Nafion® was coated onto a 500 μm O.D. wire to form a first Nafion® layer. The Nafion®-coated wire was dried at 70° C. A second Nafion® layer was subsequently coated on top of the first Nafion® layer, with a fiberglass yarn being sandwiched between such two Nafion® layers, and dried at 70° C. The final thickness of the fiberglass-reinforced Nafion® membrane layer so formed was 170-180 μm. Specifically, the 33 wt % Nafion® dispersion was obtained by evaporating a 20 wt % Nafion® 1100 EW dispersion (DuPont Fluoroproducts, Fayetteville, N.C.) in a mixture of alcohols and water. The fiberglass yarn (Product No. G37 1/0 1.0Z 690/31) was obtained from PPG Industries (Lexington, N.C.). The yarn consisted of approximately 200 filaments.

Such fiberglass-reinforced Nafion® membrane layer with the 500 μm O.D. wire core therein was cut into sections of approximately 10" long, which were heat-set sequentially at: (1) 70° C. for 60 minutes, (2) 105° C. for 30 minutes, and (3) 125° C. for 30 minutes, and subsequently immersed into hot water (80-100° C.) for 10-20 minutes, which caused the Nafion® membrane layers to swell radically and became detached from the wire core. The detached wire core was then extracted from each Nafion® membrane layer to form Nafion® hollow fiber with fiberglass embedded therein. The fiberglass-reinforced Nafion® hollow fiber showed little or no dimensional change along its longitudinal axis while treated in boiling water.

The fiberglass-reinforced Nafion® hollow fiber so formed was cleaned to remove organic and inorganic impurities. The hollow fiber was first immersed in a 3 vol % aqueous $H_2O_2$ solution at 60° C. for one hour to remove the organic impurities. After rinsing with deionized water for a few times, the hollow fiber was kept in a hot aqueous $H_2SO_4$ solution (1M) for 1~2 hour to remove inorganic impurities. Then the hollow fiber was rinsed with deionized water for a few times and dried at 70° C. for 20-30 minutes.

Preparation of a Nafion® hollow fiber membrane separator with an inner electrocatalyst layer and an outer electrocatalyst layer A Nafion® hollow fiber membrane separator with an inner electrocatalyst layer and an outer electrocatalyst layer formed thereon was prepared by the following steps:

2. Forming an Inner Electrocatalyst Layer

An inner electrocatalyst layer was formed by coating a catalyst ink onto a titanium wire of approximate 1300 μm in outer diameter. The catalyzed titanium wire was heat-set sequentially at 70° C. and 160° C. The thickness of the catalyst coating was 10-15 μm. The catalyst ink contained Pt—Ru black (50:50 by atomic weight ratio) and Nafion® as a binding material. Nafion® content in the catalyst ink was 15 wt %, and the Pt—Ru loading was 34 mg/cm². Pt—Ru black (Product No. Hispec™6000) was purchased from Alfa Aesar (Ward Hill, Mass.). A 5 wt % Nafion® dispersion in a mixture of alcohols and water (EW1100, Solution Technologies, Mendenhall, Pa.) was used for preparation of the catalyst ink.

3. Forming a Nafion® Membrane Layer

The catalyzed titanium wire was coated with a 33 wt % Nafion® solution and dried in an oven at 70° C. The thickness of the Nafion® coating was 200 μm. Specifically, such 33 wt % Nafion® dispersion was obtained by evaporating a 20 wt % Nafion® 1100EW dispersion (DuPont Fluoroproducts, Fayetteville, N.C.) in a mixture of alcohols and water.

4. Forming an Outer Electrocatalyst Layer

An outer electrocatalyst layer was formed by coating a catalyst ink of Pt black and Nafion® onto the shell side of the fiber prepared hereinabove and then dried at 70° C. Nafion® content in such catalyst ink was 15 wt %, and Pt loading on the shell was 3-4 mg/cm². Pt black (Product No. Hispec™1000) was purchased from Alfa Aesar (Ward Hill, Mass.). A 5 wt % Nafion® dispersion in a mixture of alcohols and water (EW1100, Solution Technologies, Mendenhall, Pa.) was used for preparation of the catalyst ink.

The fiber so formed was cut into sections of about 10" in length, which were heat-set sequentially at: (1) 70° C. for 60 minutes, (2) 105° C. for 30 minutes, and (3) 125° C. for 30 minutes, and subsequently immersed into hot water (80-100° C.) for 10-20 minutes, which caused the Nafion® membrane layers to swell radically and became detached from the wire core of 1300 μm OD. The detached wire core was then extracted from each Nafion® membrane layer to form Nafion® hollow fiber membranes with fiberglass embedded therein.

The Nafion® hollow fiber membranes so obtained were cleaned to remove organic and inorganic impurities. Such hollow fiber membranes were first immersed in a 3 vol % aqueous $H_2O_2$ solution at 60° C. for one hour to remove the organic impurities. After rinsing with deionized water for a few times, the hollow fiber membranes were kept in a hot aqueous $H_2SO_4$ solution (1M) for 1-2 hour to remove inorganic impurities. Then the hollow fiber membranes were rinsed with deionized water for a few times and dried at 70° C. for 20-30 minutes.

A fiberglass-reinforced Nafion® hollow fiber obtained at Step (1) and two titanium-copper clad wires of approximately 380 μm OD were inserted into the bore side of the catalyzed Nafion® hollow fiber membrane prepared in Step (2). The two Ti—Cu wires functioned as inner current collectors. A third titanium-copper clad wire of approximately 380 μm OD was placed against the shell side of the catalyzed Nafion® hollow fiber membrane to function as an outer current collector. A titanium wire of approximately 200 μm OD was used to wrap the catalyzed Nafion® hollow fiber membrane and the outer current collector together, thereby forming an unitary and complete fibrous direct methanol fuel cell.

The fibrous direct methanol fuel cell so formed was tested at room temperature and in air-breathing mode. A 32 wt % aqueous methanol solution was pumped through the bore of the fiberglass-reinforced Nafion® hollow fiber at low flow rate. Methanol from such aqueous methanol solution diffused through the methanol-separating membrane wall of such fiberglass-reinforced Nafion® hollow fiber to reach the inner electrocatalyst layer where methanol oxidation reaction took place. The open circuit voltage of such fibrous direct methanol fuel cell was 0.6 V with 32 wt % methanol solution. Fiberglass-reinforced Nafion® hollow fiber did not show any dimensional change along its longitudinal axis. A current density of 5 mA/cm$^2$ was obtained at the cell voltage of 0.3 V. When a 16 wt % aqueous methanol solution was pumped through the bore of such fiberglass-reinforced Nafion® hollow fiber, the open circuit cell voltage was 0.62 V, and the current density at 0.3V was 6.5 mA/cm$^2$.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:

1. A microfibrous direct methanol fuel cell comprising at least one microfibrous direct methanol fuel cell element arranged to carry out dissociation of methanol and combination of protons, electrons and oxygen to generate energy, said microfibrous fuel cell element having a longitudinal axis and comprising:
   (a) a microfibrous hollow membrane separator defining a bore side and a shell side;
   (b) an inner current collector at the bore side of said membrane separator;
   (c) an inner electrocatalyst layer in contact with said inner current collector and an inner surface of the membrane separator;
   (d) an outer current collector at the shell side of said membrane separator; and
   (e) an outer electrocatalyst layer in contact with said outer current collector and an outer surface of the membrane separator,
wherein said microfibrous hollow membrane separator comprises an ion exchange polymeric proton-conductive membrane wall with one or more continuous reinforcement fibers embedded within the ion exchange polymeric proton-conductive membrane wall, wherein said one or more continuous reinforcement fibers are different from said inner current collector and said outer current collector and extend longitudinally within the ion exchange polymeric proton-conductive membrane wall, with essentially all the continuous reinforcement fibers aligned parallelly with the longitudinal axis of the fuel cell element, and wherein an inner fluid passage is provided in communication with the inner electrocatalyst layer and the inner current collector for flow of either a methanol-containing or an oxygen-containing fluid.

2. The microfibrous direction methanol fuel cell of claim 1, wherein the ion exchange polymeric proton-conductive membrane wall of the membrane separator comprises ion-exchange polymeric proton-conductive material selected from the group consisting of perfiurocarbon-sulfonic-acid-based polymers, polysulfone-based polymers, perfluoroc arboxylic-acid-based polymers, styrene-vinyl-benzene-sulfonic -acid-based polymers, and styrene-butadiene-based polymers.

3. The microfibrous direct methanol fuel cell of claim 1, wherein the ion exchange polymeric proton-conductive membrane wall of the membrane separator comprises a perfluorosulfonate ionomer.

4. The microfibrous direct methanol fuel cell of claim 1, wherein the continuous reinforcement fibers are characterized by a swell potential less than that of the ion exchange polymeric membrane wall of the membrane separator.

5. The microfibrous direct methanol fuel cell of claim 1, wherein the continuous reinforcement fibers are selected from the group consisting of glass fibers, carbon fibers, polymer fibers, metal fibers, and composites and combinations thereof.

6. The microfibrous direct methanol fuel cell of claim 1, wherein the continuous reinforcement fibers comprise glass fibers.

7. The microfibrous direct methanol fuel cell of claim 1, wherein the continuous reinforcement fibers are characterized by an average cross-sectional diameter of from about 0.1 μm to about 500 μm.

8. The microfibrous direct methanol fuel cell of claim 1, being arranged in an air-breathing configuration, which allows ambient air to diffuse through the outer electrocatalyst layer and provides oxygen to the shell side of the microfibrous hollow membrane separator.

9. A microfibrous direct methanol fuel cell comprising at least one microfibrous direct methanol fuel cell element arranged to carry out dissociation of methanol and combination of protons, electrons and oxygen to generate energy, said microfibrous fuel cell element comprising:
   (a) a first microfibrous hollow membrane comprising an ion exchange polymer and defining a bore side and a shell side;
   (b) an inner current collector at the bore side of said first microfibrous hollow membrane;
   (c) an inner electrocatalyst layer contacting said inner current collector and an inner surface of said first microfibrous hollow membrane;
   (d) an outer current collector at the shell side of said first microfibrous hollow membrane;
   (e) an outer electrocatalyst layer contacting said outer current collector and an outer surface of said first microfibrous hollow membrane; and
   (f) a second microfibrous hollow membrane disposed either at the bore or the shell side of the first microfibrous hollow membrane,
   wherein an inner fluid passage is provided at the bore side of said first microfibrous hollow membrane and in communication with said inner current collector and said inner electrocatalyst layer, and wherein said second microfibrous hollow membrane encloses an additional fluid passage that is separate from said inner fluid passage, and at least one of said first and second microfibrous hollow membranes having a longitudinal axis
   and comprising an ion exchange polymeric proton-conductive membrane wall having one or more continuous reinforcement fibers embedded within the ion exchange polymeric proton-conductive membrane wall, said continuous reinforcement fibers being different from said inner current collector and said outer current collector and extending longitudinally within the ion exchange polymeric proton-conductive membrane wall, with essentially all the reinforcement fibers aligned parallelly with said longitudinal axis.

10. The microfibrous direct methanol fuel cell of claim 9, wherein the second microfibrous hollow membrane comprises a membrane selected from the group consisting of microporous membranes, semipermeable membranes, and composites and combinations thereof.

11. The microfibrous direct methanol fuel cell of claim 9, wherein the second microfibrous hollow membrane comprises a semipermeable membrane formed of an ion exchange polymer.

12. The microfibrous direct methanol fuel cell of claim 9, wherein the second microfibrous hollow membrane comprises a semipermeable membrane formed of a perfluorosulfonic-acid-based polymeric material, wherein said reinforcement fibers are all parallel to said longitudinal axis, and said inner fluid passage contains an aqueous methanol solution.

13. The microfibrous direct methanol fuel cell of claim 9, wherein the second microfibrous hollow membrane comprises a microporous membrane characterized by average pore size in a range of from about 1 Angstrom to about 10 microns.

14. The microfibrous direct methanol fuel cell of claim 9, wherein the second microfibrous hollow membrane comprises a microporous membrane selected from the group consisting of ultrafiltration membranes, microfiltration membranes, and reverse osmosis membranes.

15. The microfibrous direct methanol fuel cell of claim 9, wherein the second microfibrous hollow membrane comprises a microporous membrane containing material selected from the group consisting of polysulfone, polyvinylidene fluoride, polypropylene, regenerated cellulose acetate, polyamide, polyacrylonitrile, polyethyl methacrylate, glass and ceramic.

16. The microfibrous direct methanol fuel cell of claim 9, wherein the first microfibrous hollow membrane comprises ion exchange polymeric material selected from the group consisting of perfiurocarbon-sulfonic-acid-based polymers, polysulfone-based polymers, perfluoroc arboxylic-acid-based polymers, styrene-vinyl-benzene-sulfonic-acid-based polymers, and styrene-butadiene-based polymers.

17. The microfibrous direct methanol fuel cell of claim 9, wherein first microfibrous hollow membrane comprises a perfluorosulfonic-acid-based polymer.

18. The microfibrous direct methanol fuel cell of claim 9, wherein the second microfibrous hollow membrane is disposed at the bore side of the first microfibrous hollow membrane, and wherein the additional fluid passage is separated from the inner fluid passage by a membrane wall of said second microfibrous hollow membrane.

\* \* \* \* \*

UNITED STATES PATENT AND TRADEMARK OFFICE
CERTIFICATE OF CORRECTION

PATENT NO. : 7,422,813 B2
APPLICATION NO. : 10/863705
DATED : September 9, 2008
INVENTOR(S) : Ray R. Eshraghi It is certified that error appears in the above-identified patent and that said Letters Patent is hereby corrected as shown below:

Column 1, line 34: "copolvmer" should be -- copolymer --.

Column 1, line 38: "perfiucrosulfonic" should read -- perfluorosulfonic --.

Column 9, line 49: "7,358,545" should be -- 7,354,545 --.

Column 13, line 55: "Layer" should be -- layer --.

Column 21, line 53: "AIG" should be -- A/G --.

Column 21, line 65: "was 34" should be -- was 3-4 --.

Column 22, line 33: "is 34" should be -- is 3-4 --.

Column 24, line 23: "was 34" should be -- was 3-4 --.

Column 26, line 5: "perfiurocarbon" should be -- perfluorocarbon --.

Column 26, line 6: "perfluoroc" should be -- perfluoroc- --.

Column 26, lines 7-8: "-sulfonic –acid" should be -- -sulfonic-acid --.

Column 28, line 14: "perfiurocarbon" should be -- perfluorocarbon --.

UNITED STATES PATENT AND TRADEMARK OFFICE
CERTIFICATE OF CORRECTION

PATENT NO. : 7,422,813 B2
APPLICATION NO. : 10/863705
DATED : September 9, 2008
INVENTOR(S) : Ray R. Eshraghi It is certified that error appears in the above-identified patent and that said Letters Patent is hereby corrected as shown below:

Column 28, line 15: "perfluoroc arboxylic-acid" should be
-- perfluorocarboxylic-acid --.

Signed and Sealed this

Second Day of December, 2008

JON W. DUDAS
*Director of the United States Patent and Trademark Office*